US010568024B2

(12) United States Patent
Nam et al.

(10) Patent No.: US 10,568,024 B2
(45) Date of Patent: Feb. 18, 2020

(54) METHOD FOR INTERNET OF THINGS COMMUNICATION AND AN ELECTRONIC DEVICE THEREOF

(71) Applicant: SAMSUNG ELECTRONICS CO., LTD., Suwon-si, Gyeonggi-do (KR)

(72) Inventors: Changwon Nam, Seoul (KR); Songyean Cho, Seoul (KR); Chaeman Lim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 20 days.

(21) Appl. No.: 15/869,855

(22) Filed: Jan. 12, 2018

(65) Prior Publication Data
US 2018/0206188 A1 Jul. 19, 2018

(30) Foreign Application Priority Data
Jan. 18, 2017 (KR) .................. 10-2017-0008611

(51) Int. Cl.
*H04W 52/02* (2009.01)
*H04W 36/14* (2009.01)
*H04W 48/16* (2009.01)

(52) U.S. Cl.
CPC ....... *H04W 52/0203* (2013.01); *H04W 48/16* (2013.01); *H04W 36/14* (2013.01)

(58) Field of Classification Search
CPC . H04W 52/02; H04W 52/0216; H04W 84/12; H04W 84/18
USPC .......................................... 370/311
See application file for complete search history.

(56) References Cited

U.S. PATENT DOCUMENTS

| 7,558,226 B2* | 7/2009 | Anderson | ......... H04W 52/0216 370/311 |
| 9,338,735 B2 | 5/2016 | Lindoff et al. | |
| 2008/0176579 A1 | 7/2008 | Abdel-Kader | |
| 2013/0010663 A1* | 1/2013 | Chin | ................ H04W 36/0072 370/311 |
| 2013/0040692 A1 | 2/2013 | Chen et al. | |
| 2013/0201892 A1* | 8/2013 | Holma | .................. H04W 76/28 370/311 |
| 2014/0378140 A1* | 12/2014 | Gopal | ................... H04W 48/16 455/437 |
| 2015/0173122 A1 | 6/2015 | Schliwa-Bertling et al. | |
| 2016/0100449 A1 | 4/2016 | Jang et al. | |

(Continued)

OTHER PUBLICATIONS

Search Report and Written Opinion dated Apr. 26, 2018 in counterpart International Patent Application No. PCT/KR2018/000734.

(Continued)

*Primary Examiner* — Gbemileke J Onamuti
*Assistant Examiner* — Sanjay K Dewan
(74) *Attorney, Agent, or Firm* — Nixon & Vanderhye P.C.

(57) ABSTRACT

An example method for an electronic device includes determining, while accessing a first network supporting a first Radio Access Technology (RAT), to change a serving RAT to a second RAT, identifying a time interval in which the electronic device maintains an active state to communicate with the first network, scanning the second RAT during a period determined based on a start timing or an end timing of the time interval, and accessing a second network supporting the second RAT based on a result of the scanning.

20 Claims, 21 Drawing Sheets

(56) References Cited

U.S. PATENT DOCUMENTS

2016/0128004 A1    5/2016  Lee et al.
2016/0374103 A1   12/2016  Sanka et al.
2017/0339629 A1*  11/2017  Lindoff ................. H04W 48/16
                                                        370/311

OTHER PUBLICATIONS

Awada, A., et al, "Cell-pair specific optimization of the Inter-RAT Handover Parameters in SON," 2012 IEEE 23rd International Symposium on Personal, Indoor and Mobile Radio Communications (PIMRC), Sep. 9, 2012, 6 pages.
European Extended Search Report dated Oct. 23, 2019 for EP Application No. 18741858.7.
Ericsson: "Inter-RAT idle mode mobility in NB-IoT", vol. RAN Wg2, No. Reno, US, Nov. 13, 2016.
$3^{rd}$ Generation Partnership Project; Technical Specification Group Services and System Aspects, 3GPP Standard, vol. SA WG2, Dec. 16, 2016.
Ericsson: RRM Requirements with eDRX for NB-IoT, $3^{rd}$ Generation Partnership Project, vol. RAN WG4, Apr. 1, 2016.

* cited by examiner

METHOD FOR INTERNET OF THINGS COMMUNICATION AND AN ELECTRONIC DEVICE THEREOF

CROSS-REFERENCE TO RELATED APPLICATION(S)

The present application is based on and claims priority under 35 U.S.C. § 119 to a Korean patent application filed in the Korean Intellectual Property Office on Jan. 18, 2017, and assigned Serial No. 10-2017-0008611, the contents of which are incorporated by reference herein in their entirety.

TECHNICAL FIELD

The present disclosure relates generally to a method and an electronic device for providing Internet of Things (IoT) communication.

BACKGROUND

The Internet of Things (IoT) is drawing great attention from communication providers and terminal manufacturers as a new service of advanced mobile communication. In this respect, standard groups such as $3^{rd}$ Generation Partnership Project (3GPP) are standardizing communication techniques for the IoT. For example, release-13 of the 3GPP standardizes enhanced Machine Type Communication (eMTC) and Narrow Band (NB)-IoT. In addition, various other IoT communication techniques such as LoRa and sigFox are suggested.

As various IoT communication techniques are developed, a communication environment can cover different IoT networks. Hence, a method for using a suitable IoT network for characteristics of an IoT device is desirable.

SUMMARY

To address the above-discussed deficiencies of the prior art, it is an example aspect of the present disclosure to provide a method and an electronic device for effectively providing Internet of Things (IoT) communication.

Another example aspect of the present disclosure is to provide a method and an electronic device for switching between different IoT networks.

Yet another example aspect of the present disclosure is to provide a method and an electronic device for scanning an IoT network.

According to one example aspect of the present disclosure, a method of an electronic device can include determining, while accessing a first network supporting a first Radio Access Technology (RAT), to change a serving RAT to a second RAT, identifying a time interval in which the electronic device maintains an active state to communicate with the first network, scanning the second RAT during a period determined based on a start timing or an end timing of the time interval, and accessing a second network supporting the second RAT based on a result of the scan. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

According to another example aspect of the present disclosure, a method of an electronic device can include determining, while accessing a first network supporting a first RAT, to change a serving RAT to a second RAT, scanning the second RAT, temporarily accessing the first network for attempting to receive data buffered in the first network, and accessing a second network supporting the second RAT. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

According to yet another example aspect of the present disclosure, an electronic device can include a housing, Radio Frequency (RF) circuitry, disposed within the housing, for processing a signal, a processor, disposed within the housing, coupled to the RF circuitry, and a memory, disposed within the housing, coupled to the processor. The memory stores instructions that, when executed, cause the processor to determine, while accessing a first network supporting a first radio access technology (RAT), to change a serving RAT to a second RAT, to identify a time interval in which the electronic device maintains an active state to communicate with the first network, to control scanning the second RAT during a period determined based on a start timing or an end timing of the time interval, and to control accessing a second network supporting the second RAT based on a result of the scan. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

According to still another example aspect of the present disclosure, an electronic device can include a housing, RF circuitry, disposed within the housing, for processing a signal, a processor, disposed within the housing, coupled to the RF circuitry, and a memory, disposed within the housing, coupled to the processor. The memory stores instructions that, when executed, cause the processor to determine, while accessing a first network supporting a first RAT, to change a serving RAT to a second RAT, to control scanning the second RAT, to control temporarily accessing the first network for attempting to receive data buffered in the first network, and to control accessing a second network supporting the second RAT. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements and wherein.

Throughout the drawings, like reference numerals will be understood to refer to like parts, components and structures.

DETAILED DESCRIPTION

Figure 1A:
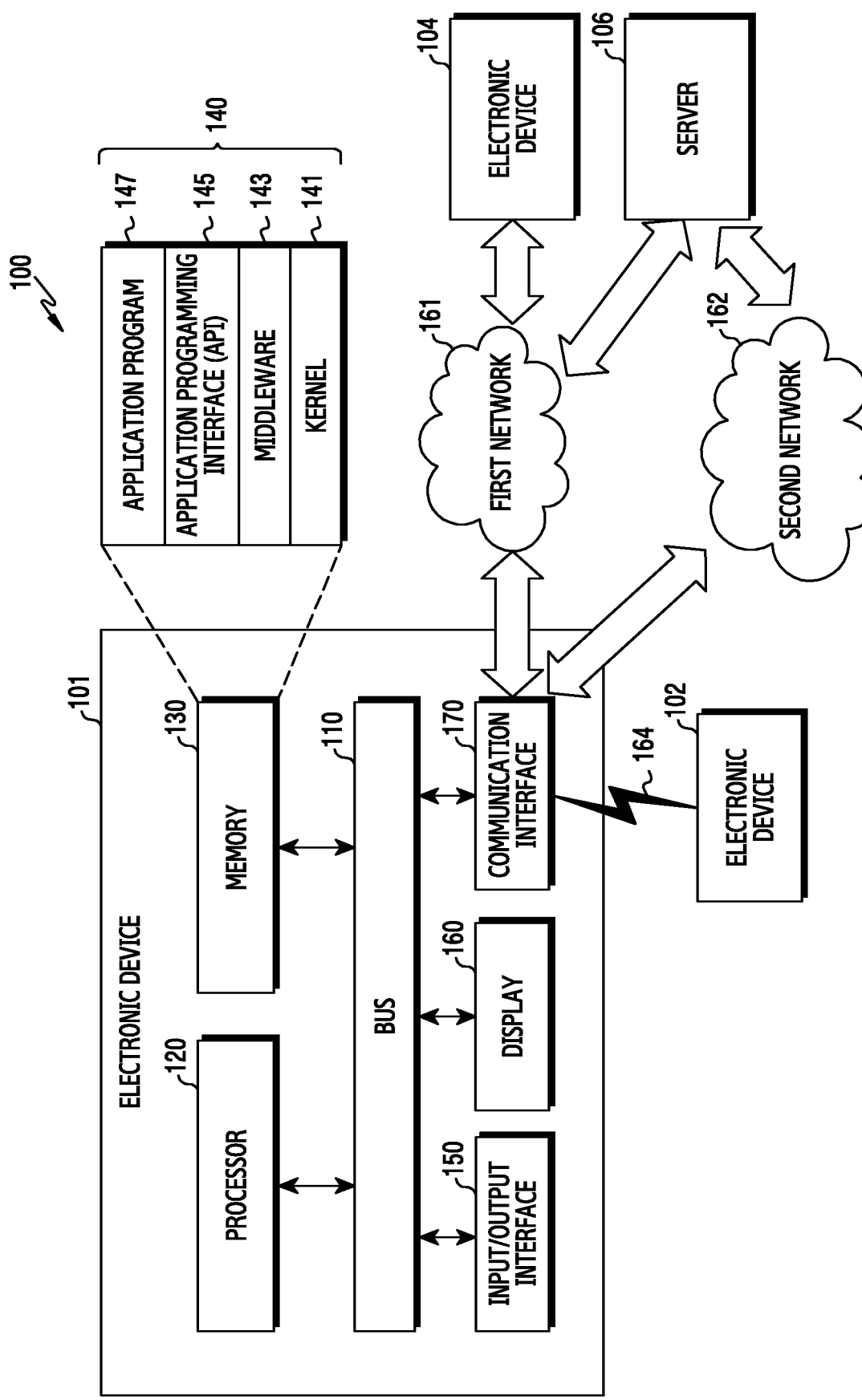
FIG. 1A illustrates an electronic device in a network environment according to various example embodiments of the present disclosure.

Hereinafter, various example embodiments of the present disclosure are described in greater detail below with reference to the accompanying drawings. An embodiment and the terms used in this present disclosure are not intended to limit the disclosed technology to a specific embodiment form, and instead should be construed as including various changes of the corresponding example embodiments, equivalents thereof, and/or alternatives thereof. In the drawings, like reference symbols may denote like constituent elements. The expression of a singular form may include the expression of a plural form unless otherwise dictated clearly in context. In the present disclosure, the expressions "A or B", "at least one of A and/or B", etc. may include all available combinations of items enumerated together. The expressions "1st", "2nd", "first", "second", etc. may modify corresponding elements irrespective of order and/or importance, and are simply used to distinguish one element from another element and do not limit the corresponding elements. When it is mentioned that any (e.g., 1st) element is "(operatively or communicatively) coupled with/to" or is "connected to" another (e.g., 2nd) element, the any element may be directly coupled to the other element, or be coupled through a further element (e.g., a third element).

The expression "configured (or set) to~" used in the present disclosure may be used interchangeably with, for example, "suitable for~", "having the capacity to~", "designed to~", "adapted to~", "made to~", or "capable of~" in a hardware or software manner in accordance to circumstances. In any situation, the expression "device configured to~" may imply that the device is "capable of ~" together with other devices or components. For example, the phrase "processor configured (or set) to perform A, B and C" may represent, for example, an exclusive processor (e.g., embedded processor) for performing a corresponding operation, or a generic-purpose (general-purpose) processor (e.g., a central processing unit (CPU) or an application processor (AP)) capable of performing corresponding operations by executing one or more software programs stored in a memory device.

An electronic device according to various embodiments of the present document may, for example and without limitation, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera, a wearable device or the like. The wearable device may include, without limitation, at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo), a bio implantation type (e.g., an implantable circuit) or the like. According to certain example embodiments, the electronic device may include, for example and without limitation, at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder, an electronic frame or the like.

In another example embodiment, the electronic device may include, without limitation, at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.) or the like.

According to certain example embodiments, the electronic device may include, without limitation, at least one of a part of furniture, a building/structure or a car, an electronic board, an electronic signature receiving device, a projector, various metering devices (e.g., tap water, electricity, gas, radio wave metering devices or the like) or the like. In various example embodiments, the electronic device may be flexible, or be a combination of two or more of the aforementioned various devices. The electronic device according to an example embodiment of the present disclosure is not limited to the aforementioned devices. In the present disclosure, the term 'user' may denote a person who uses the electronic device or a device (e.g., an artificial-intelligent electronic device) which uses the electronic device.

FIG. 1A is a block diagram of a network environment system according to an example embodiment of the present disclosure.

Referring to FIG. 1A, an electronic device 101 within a network environment 100 in various example embodiments is described. The electronic device 101 may include a bus 110, a processor (e.g., processing circuitry) 120, a memory 130, an input/output interface (e.g. input/output interface circuitry) 150, a display 160, and a communication interface (e.g., communication interface circuitry) 170. In some example embodiments, the electronic device 101 may omit at least one of the aforementioned elements and/or additionally include another element(s). The bus 110 may, for example, include a circuit or circuitry coupling the elements 120, 130, 150, 160 and 170 with one another and forwarding communication (e.g., a control message or data) between the elements. The processor 120 may include, without limitation, one or more of a central processing unit (CPU), an application processor (AP) or a communication processor (CP). The processor 120 may, for example, execute operations or data processing for control and/or communication of at least one another element of the electronic device 101.

The memory 130 may include a volatile and/or non-volatile memory. The memory 130 may, for example, store a command(s) or data related to at least one another element of the electronic device 101. According to an example embodiment, the memory 130 may store software and/or program 140. The program 140 may, for example, include a kernel 141, middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147). Also, the kernel 141 may provide an interface through which the middleware 143, the API 145 and/or the application program 147 may control or manage the system resources of the electronic device 101 by accessing the individual elements of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority for using the system resources (e.g., the bus 110, the processor 120, the memory 130 or the like) of the electronic device 101 to at least one of the application programs 147, and process one or more work requests. The API 145 is, for example, an interface enabling the application program 147 to control a function provided by the kernel 141 or the middleware 143 and may, for example, include at least one interface or function (e.g., an instruction) for file control, window control, image processing, character control or the like. The input/output interface 150 may forward a command or data inputted from a user or another external device to other element(s) of the electronic device 101, or output a command or data received from the other element(s) of the electronic device 101 to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various content (e.g., text, an image(s), a video, an icon(s), a symbol(s) and/or the like) to a user. The display 160 may include a touch screen. For example, the display 160 may receive a touch, gesture, proximity or hovering input that uses an electronic pen or a part of the user's body.

The communication interface 170 may, for example, establish communication between the electronic device 101 and an external device (e.g., the first external electronic device 102, the second external electronic device 104 and/or the server 106). For example, the communication interface 170 may be coupled to a first network 161 and/or a second network 162, through wireless communication or wired communication, to communicate with the external devices (e.g., the second external electronic device 104 and/or the server 106).

The wireless communication may, for example and without limitation, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an example embodiment, the wireless communication may, for example, include IoT communication using at least one of narrow band-IoT (NB-IoT), machine type communication (MTC), enhanced MTC (eMTC), lora, sigfox, and the like. According to an example embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN), as illustrated by element 164 of FIG. 1A. According to an example embodiment, the wireless communication may include GNSS. GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with "GNSS". The wired communication may, for example, include at least one of a universal serial bus (USB), a high definition multimedia interface (HDMI), a recommended standard-232 (RS-232), power line communication (PLC), a plain old telephone service (POTS), and the like.

Each of the first and second electronic devices 102 and 104 may be a device of the same or different type from that of the electronic device 101. According to various example embodiments, all or some of operations executed in the electronic device 101 may be executed in another electronic device or a plurality of electronic devices (e.g., the electronic devices 102, 104 and/or the server 106). According to an example embodiment, in a case in which the electronic device 101 performs some function or service automatically or in response to a request, the electronic device 101 may, instead of or in addition to executing the function or service in itself, send a request for execution of at least a partial function associated with this to another device (e.g., electronic device 102, 104 and/or server 106). The other electronic device (e.g., electronic device 102, 104 and/or server 106) may execute the requested function or additional function, and forward the execution result to the electronic device 101. The electronic device 101 may process the received result as it is or additionally, to provide the requested function or service. For this, cloud computing, distributed computing or client-server computing technology may be used, for example.

According to an example embodiment, at least one of the first network 161 and the second network 162 can include a telecommunication network, for example, at least one of a computer network (e.g., a Local Area Network (LAN) or a Wide Area Network (WAN)), Internet, and a telephone network. For example, the first network 161 and the second network 162 can be different networks designed for Internet of Things (IoT) communication. The first network 161 and the second network 162 can support different Radio Access Technologies (RATs). Herein, it can be construed that the different RATs support different RATs (e.g., Orthogonal Frequency Division Multiple Access (OFDMA), Code Division Multiple Access (CDMA), Frequency Division Multiple Access (FDMA), Time Division Multiple Access (TDMA), Non-Orthogonal division Multiple Access (NOMA)), conform to different standards, support different maximum data rates, support different services, use different system bandwidths, use different frequency bands, or require different device powers. For example, the first network 161 and the second network 162 can differ from each other in at least one of the RAT, the standard, the maximum data rate, the service, the system bandwidth, an operating frequency, and a power requirement. Specifically, the first network 161 can be a Narrow Band (NB)-IoT network, and the second network 162 can be an enhanced Machine Type Communication (eMTC) network as shown in FIG. 1B.

Figure 1B:
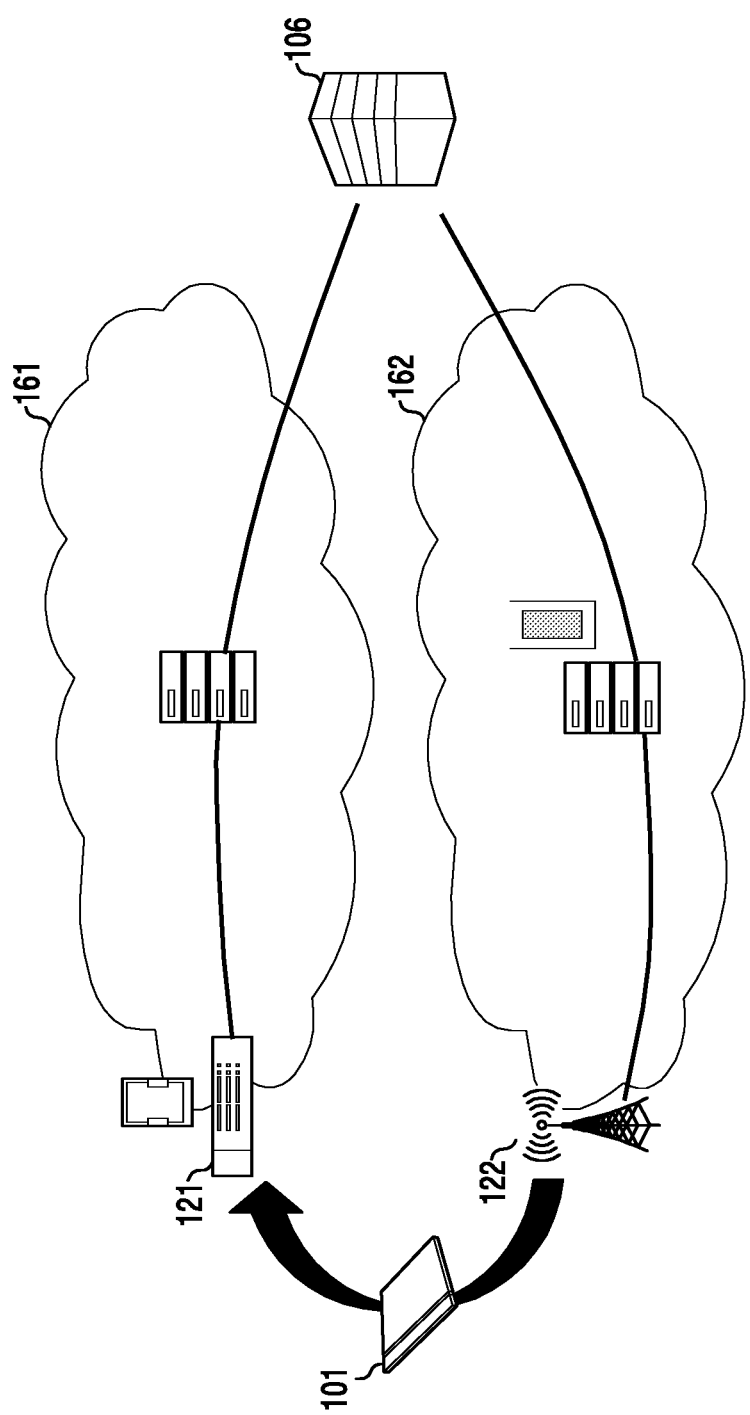
FIG. 1B illustrates an electronic device in an Internet of Things (IoT) network environment according to various example embodiments of the present disclosure.

FIG. 1B illustrates an electronic device in an IoT network environment according to various example embodiments of the present disclosure. Referring to FIG. 1B, an electronic device 101 can access the first network 161 via a first base station 121 and access the second network 162 via a second base station 122. The electronic device 101 can communicate with a server 106 over the first network 161 or the second network 162. The server 106 is an entity which provides information required to operate the electronic device 101 or receives information generated in operations of the electronic device 101, and can communicate with other electronic device (e.g., the electronic device 104).

Figure 1C:
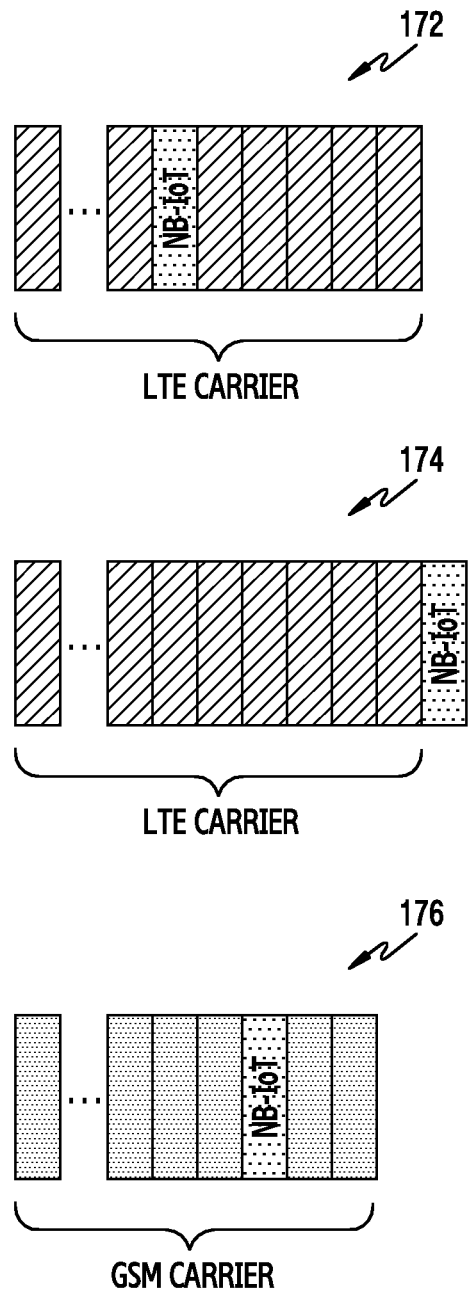
FIG. 1C illustrates examples of system bandwidth for IoT communication according to various example embodiments of the present disclosure.

The NB-IoT supported in the first network 161 is a new technique adopted for Low Power Wide Area (LPWA) in $3^{rd}$ Generation Partnership Project (3GPP) release-13. The NB-IoT can use a bandwidth reduced up to 180 kHz. The NB-IoT can be operated in three modes based on an operating frequency as shown in FIG. 1C. Referring to FIG. 1C, the NB-IoT can be operated in one of an in-band operation 172, a guard band operation 174, and a stand-alone operation 176, according to a relationship with a LTE carrier. The in-band operation 172 uses resources in a Long Term Evolution (LTE) frequency band, the guard band operation 174 uses a guard band defined in the LTE frequency band, and the stand-alone operation 176 uses a Global System for Mobile (GSM) frequency band or a potential IoT dedicated frequency band. The guard band operation 174 can enable the NB-IoT communication without additional bandwidth allocation.

Downlink communication of the NB-IoT can use 15-kHz subcarrier spacing and use a 180 kHz band corresponding to one Physical Resource Block (PRB). Uplink communication can support two subcarrier spacings of 3.75 kHz and 15 kHz, single-tone transmission can support both of 3.75 kHz and 15 kHz, and multi-tone transmission can support only 15 kHz. Accordingly, the 3GPP standard defines a Category (Cat)-NB1 which is a new device category for the NB-IoT.

The eMTC supported in the second network 162 provides advances from MTC technology. The MTC requires a single receive Radio Frequency (RF) chain and maximum data rate reduction according to cost reduction requirements for the low-cost IoT communication, and includes half-duplex as an option. The 3GPP standard defines Cat-0 which is a new device category for the MTC. The eMTC, which evolved from the MTC, includes an additional technique for extending coverage and reducing the cost from the MTC. Compared with the MTC, the eMTC features maximum bandwidth reduction (e.g., a device bandwidth reduces to 1.4 MHz in downlink/uplink), maximum transmit power reduction (a maximum transmit power of the terminal decreases from 23 dBm to 20 dBm), and coverage extension (repetitive transmission of a physical layer transport channel, coverage enhances up to 15 dB using subframe bundling and Power Spectral Density (PSD) boosting). Thus, the 3GPP standard defines a Cat-M1 which is a new device category for the eMTC. Also, the 3GPP standard defines 'schedulingInforSIB1-BR-r13' in a Master Information Block (MIB) so that a base station can notify whether the eMTC is supported or not.

The above-stated device categories are compared in Table 1.

TABLE 1

|  | Cat-1 (Rel-8) | Cat-0 (Rel-12) | Cat-M1 (Rel-13) | Cat-NB1 (Rel-13) |
|---|---|---|---|---|
| spectrum |  | in-band |  | in-band guard band stand alone |
| bandwidth | 20 MHz | 20 MHz | 1.4 MHz | 180 kHz |
| coverage | same as LTE |  | +15 dB | +21 dB |
| terminal transmission power | 23 dBm |  | 20 dBm | 23 dBm |
| data rate | 10 Mbs | 1 Mbps | 1 Mbps | 250 kbps |

Figure 1D:
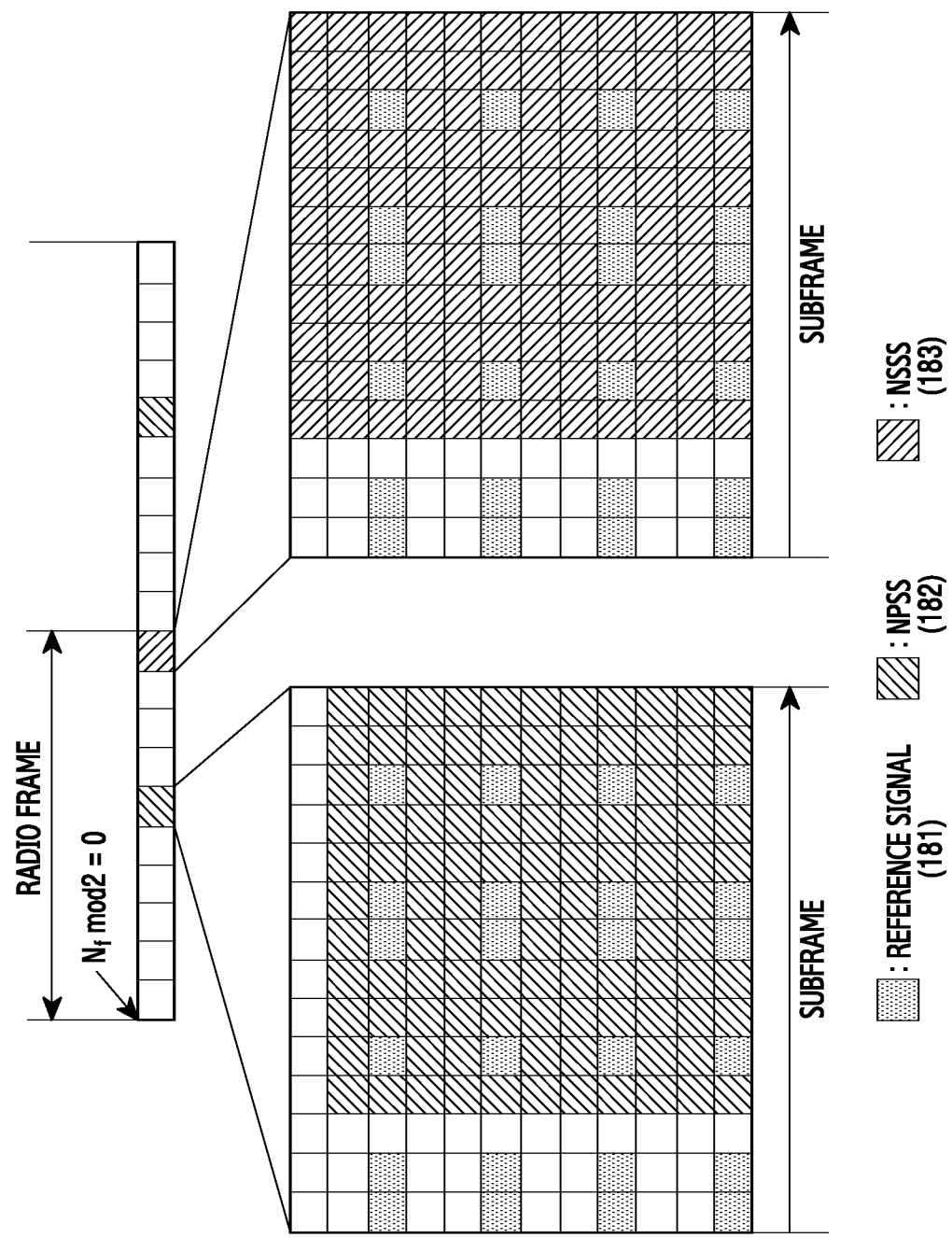
FIG. 1D illustrates examples of a synchronization signal for IoT communication according to various example embodiments of the present disclosure.

A synchronization signal used in the NB-IoT can be configured as shown in FIG. 1D. Referring to FIG. 1D, a Narrowband Primary Synchronization Signal (NPSS) 182 and a Narrowband Secondary Synchronization Signal (NSSS) 183 can have a different structure from an LTE synchronization signal for cellular communication. For example, the NPSS 182 has a length of 11, includes a Zadoff-Chu (ZC) sequence with a root index of 5, and can be transmitted over first through eleventh subcarriers of a subframe#5. For example, the NSSS 183 includes a combination of a ZC sequence and a binary scrambling sequence in length of 131 and can be transmitted over 12 subcarriers of a subframe#9. As shown in FIG. 1D, in a subframe carrying the NPSS 182 or the NSSS 183, three front-end OFDM symbols do not carry the synchronization signal in order to avoid a collision with a downlink control channel (e.g., Physical Downlink Control Channel (PDCCH)). Likewise, resource elements carrying a reference signal 181 (e.g., a Common Reference Signal (CRS)) may not deliver the synchronization signal (e.g., the NPSS 182 or the NSSS 183). The electronic device 101 can search for an NB-IoT cell using the NPSS 182 and the NSSS 183 and obtain cell identification information (e.g., Physical Cell Identity (PCID)) through the NSSS 183.

Figure 2:
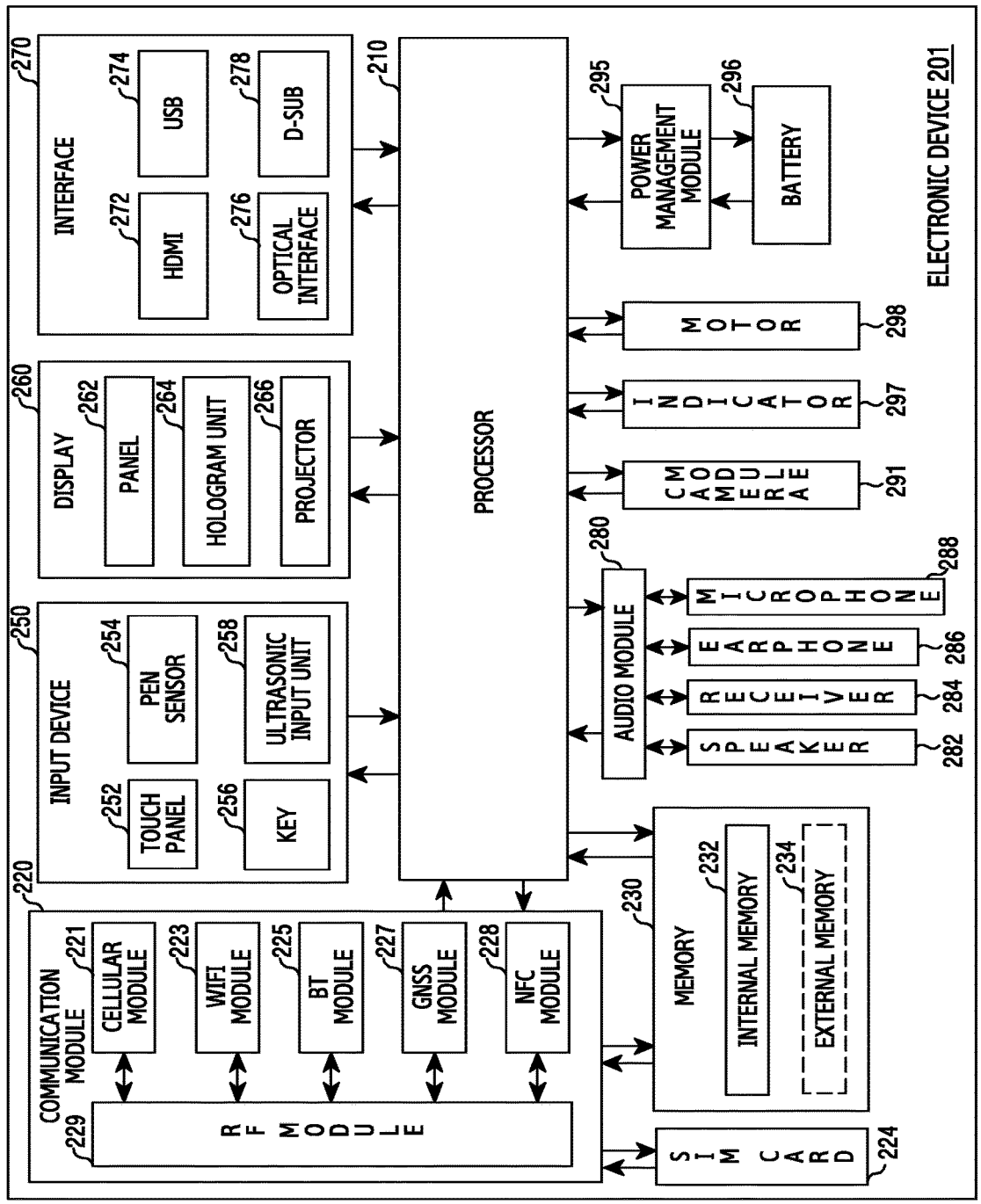
FIG. 2 illustrates a block diagram of an electronic device according to various example embodiments of the present disclosure.

FIG. 2 is a block diagram of an electronic device according to an example embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may, for example, be implemented as a system on chip (SoC). According to an example embodiment, the processor 210 may further include a graphic processing unit (GPU) and/or an image signal processor (ISP). The processor 210 may include at least some (e.g., cellular module 221) of the other elements illustrated in FIG. 2 as well. The processor 210 may load a command or data received from at least one of the other elements illustrated in FIG. 2 (e.g., non-volatile memory), to a volatile memory, to process the loaded command or data, and store the result data in the non-volatile memory.

The communication module 220 may, for example, have the same or similar construction as the communication interface 170 in FIG. 1A. The communication module 220 may, for example, include a cellular module 221, a WiFi module 223, a Bluetooth module 225, a GNSS module 227, a near field communication (NFC) module 228, and a radio frequency (RF) module 229. The cellular module 221 may, for example, provide voice telephony, video telephony, a text service, an Internet service or the like through a telecommunication network. According to an example embodiment, the cellular module 221 may perform the identification and authentication of the electronic device 201 within the telecommunication network, by using the subscriber identification module (e.g., SIM card) 224. According to an example embodiment, the cellular module 221 may perform at least some functions among functions that the processor 210 may provide. According to an example embodiment, the cellular module 221 may include a communication processor (CP). According to some example embodiments, at least some (e.g., two or more) of the cellular module 221, the WiFi module 223, the Bluetooth module 225, the GNSS module 227 and the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna, other circuitry, or the like. According to another example embodiment, at least one of the cellular module 221, the WiFi module 223, the Bluetooth module 225, the GNSS module 227 and the NFC module 228 may transceive an RF signal through a separate RF module. The subscriber identification module 224 may, for example, include a card including a subscriber identification module and/or an embedded SIM. The subscriber identification module 224 may include unique identification information (e.g., integrated circuit card identifier (ICCID)) or subscriber information (e.g., international mobile subscriber identity (IMSI)).

The memory 230 (e.g., corresponding to memory 130 in FIG. 1A) may, for example, include an internal memory 232 and/or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include, without limitation, a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The input device 250 may, for example and without limitation, include a touch panel 252, a (digital) pen sensor 254, a key 256 and/or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include control circuitry. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., corresponding to the display 160 in FIG. 1A) may include a panel 262, a hologram device 264, and/or a projector 266, along with associated control circuitry. The panel 262 may, for example, be implemented to be flexible, transparent, or wearable. The panel 262 may be constructed as one or more modules together with the touch panel 252. The hologram device 264 may display a three-dimensional image in the air using an interference of light. The projector 266 may project light onto a screen, to display an image. The screen may, for example, be located inside or outside the electronic device 201.

The interface 270 may, for example, include an HDMI 272, a USB 274, an optical interface 276 and/or a D-sub-miniature (D-sub) 278, along with associated circuitry. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert sound and electrical signals interactively. At least some elements of the audio module 280 may be, for example, included in the input output interface 150 illustrated in FIG. 1A. The audio module 280 may for example, process sound information that is inputted or outputted through a speaker 282, a receiver 284, an earphone 286, the microphone 288 or the like. The camera module 291 is, for example, a device able to photograph a still image and a video. According to an example embodiment, the camera module 291 may include one or more image sensors (e.g., front sensor or rear image sensor(s)), a lens, an image signal processor (ISP) and/or a flash (e.g., an LED, a xenon lamp or the like). The power management module 295 may, for example, manage the electric power of the electronic device 201. According to an example embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. The wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature. The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201. The motor 298 may convert an electrical signal into a mechanical vibration, and may generate a vibration, a haptic effect or the like. The electronic device 201 may, for example, include a mobile TV support device (e.g., a GPU) capable of processing media data according to the standards of digital multimedia broadcasting (DMB), digital video broadcasting (DVB), mediaFlo™ or the like. Each of the elements described in the present disclosure may include one or more components, and a name of the corresponding element may be varied according to the kind of the electronic device. In various example embodiments, the electronic device (e.g., electronic device 201) may omit some elements, or further include additional elements, or combine some of the elements to configure one entity, but identically perform functions of corresponding elements before combination.

Figure 3:
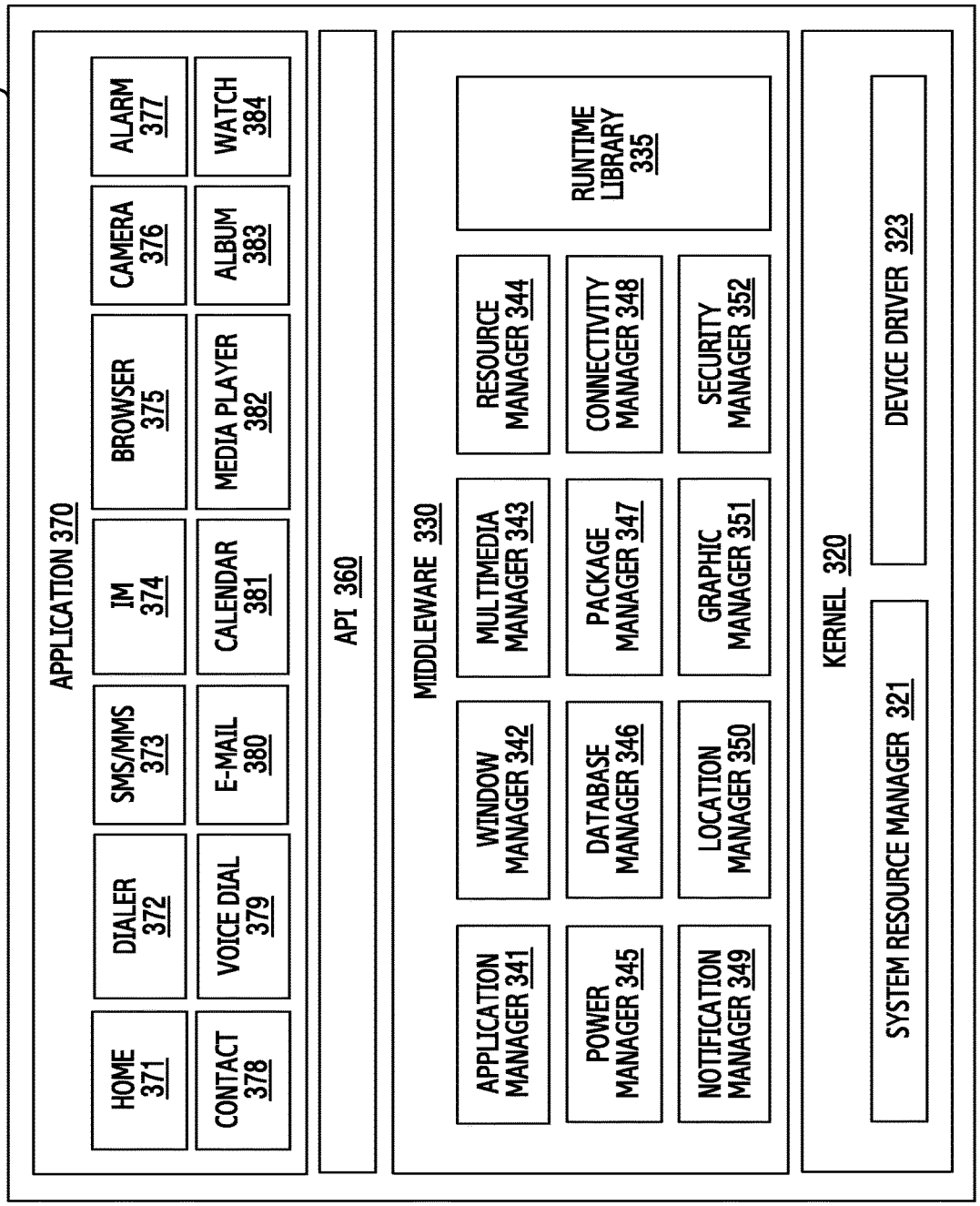
FIG. 3 illustrates a block diagram of a program module according to various example embodiments of the present disclosure.

FIG. 3 is a block diagram of a program module according to an example embodiment of the present disclosure.

Referring to FIG. 3, a program module 310 (e.g., corresponding to the program 140 in FIG. 1A) may include an Operating System (OS) for controlling resources related to an electronic device (e.g., the electronic device 101) and/or various applications (e.g., the application program 147) running on the operating system. The operating system may, for example, include Android™, iOS™, Windows™, Symbian™, Tizen™ or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The middleware 330 may, for example, provide a function that the application 370 commonly needs, or provide various functions to the application 370 through the API 360 so that the application 370 may make use of restricted or limited system resources within an electronic device. According to an example embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 and/or a security manager 352. The power manager 345 may, for example, manage a battery capacity or a power supply, and provide power information required for an operation of an electronic device. The API 360 is, for example, a set of API programming functions, and may be provided to have a construction in accordance with the operating system. The application 370 may, for example, include a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, a watch (clock) 384, health care (e.g., measuring a momentum, a blood sugar or the like), or an environment information (e.g., air pressure, humidity or temperature information) provision application. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

As stated above, the electronic device according to various example embodiments can execute at least one application and conduct various functions. Also, the electronic device can access the network (e.g., the first network 161, the second network 162). The first network 161 and the second network 162 can have the following characteristics.

The first network 161 and the second network 162 can support the IoT communication and operate according to a protocol standardized for the IoT communication. For example, the first network 161 and the second network 162 can be networks for a terminal which is generally stationary, rather than being carried by a user. For example, the first network 161 and the second network 162 can be the networks for a terminal having mobility below a certain level. Naturally, compared to the cellular network, the first network 161 and the second network 162 can require less transmission power, support a lower data rate, and use a smaller system bandwidth. An operation mode for power reduction supported in the first network 161 and the second network 162 can have a quite long deactivation/sleep period, compared with an operation mode for the power reduction supported in the cellular network. For example, the operation mode for the power reduction supported in the first network 161 and the second network 162 have a longer period of no communication than the cellular network.

For example, the first network 161 and the electronic device 101 can support the NB-IoT. In this case, since the first network 161 and the electronic device 101 mostly exchange short messages, they can exchange data sufficiently while the electronic device 101 is connected to one cell. Hence, the second network 162 may not support connected mode mobility relating to mobility of a Radio Resource Control Connected (RRC_CONNECTED), for example, handover and measurement reporting, inter-RAT cell reselection, and inter-RAT mobility in connected mode.

Accordingly, when requiring cell change, the electronic device 101 can switch to an RRC_IDLE mode and then perform cell reselection. In so doing, to support the cell reselection, the base station 121 of the first network 161 can transmit, as system information, threshold and offset information (e.g., SIBType-NB3) relating to intra-frequency and inter-frequency cell selections, intra-frequency neighboring NB-IoT cell list information (e.g., SIBType-NB4), and inter-frequency neighboring NB-IoT cell list information (e.g., SIBType-NB5). Herein, since the inter-frequency is defined based on 180 kHz, a cell using a different PRB in the same LTE band can be regarded as an inter-frequency cell. The electronic device 101 can perform the cell reselection based on reselection information provided from the base station 121.

The first network 161 and the second network 162 may not support inter-RAT handover and inter-RAT cell reselection. The first network 161 does not support handover from the NB-IoT to the LTE network, and the LTE network and the NB-IoB network can be treated as different RATs. Hence, base stations of the first network 161 and the second network 162 may not provide information about other RATs. Thus, the electronic device 101 needs to search for other RAT cell(s) by itself, and prepare and operate for the cell reselection.

The first network 161 and the second network 162 can include separate core networks. For example, the first network 161 can uses an LTE core, whereas the second network 162 can use a dedicated core separated from the LTE network. As the first network 161 and the second network 162 are separated, packet forwarding between them can be limited. Hence, when the electronic device 101 migrates from the first network 161 to the second network 162, packets buffered in the first network 161 may be missing, rather than being delivered to the second network 162.

Now, the following explains various example embodiments of the electronic device 101 for scanning another RAT when the base station does not provide the other RAT information, and receiving the buffered packets without core interoperation.

While the inter-RAT handover/cell reselection is not supported and the cores are separated by way of example, various example embodiments to be explained can be equally applied when the cores are interoperated or the inter-RAT handover/cell reselection is supported. For example, a packet forwarding technique to be described can be used when core interoperation has a temporary failure or core overhead is to be reduced due to the core interoperation. Also, although information for scanning another RAT is provided, a scanning technique to be described can be used to attain more scanning opportunities.

Figure 4A:
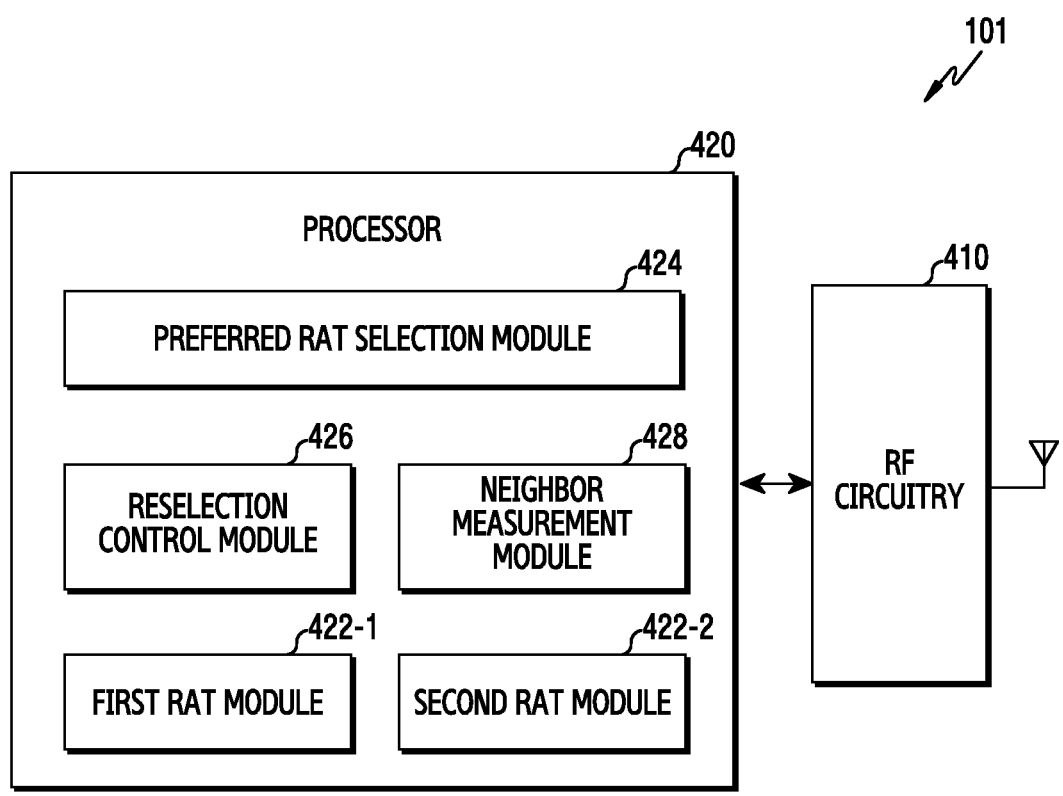
FIG. 4A illustrates a functional structure of an electronic device according to various example embodiments of the present disclosure.

FIG. 4A illustrates a functional structure of an electronic device according to various example embodiments of the present disclosure. FIG. 4A depicts a structure of the electronic device 101.

Referring to FIG. 4A, the electronic device 101 (e.g., the electronic device 201 of FIG. 2) according to an example embodiment can include RF circuitry 410 and a processor 420.

The RF circuitry 410 can process signal transmission and reception. The RF circuitry 410 can include at least one RF path, and each RF path can include hardware components for processing a signal. For example, the RF circuitry 410 can include an amplifier, a filter, an oscillator, a mixer, and the like. A configuration of the components of the RF circuitry 410 can change under control of the processor 420. The RF circuitry 410 can generate or detect a signal of a particular frequency band. The components of the RF circuitry 410 can be activated or deactivated under the control of the processor 420.

The processor 420 can control operations of the electronic device 101, including the operations of the RF circuitry 410. For example, the processor 420 can control the RF circuitry 410, and send or receive a signal through the RF circuitry 410. For example, the processor 420 can activate or deactivate at least one of the components of the RF circuitry 410 according to a required operation timing. The processor 420 can change an operating frequency of the RF circuitry 410 according to a system band. In an example embodiment, the processor 420 can include a first RAT module 422-1, a second RAT module 422-2, a preferred RAT selection module 424, a reselection control module 426, and a neighbor measurement module 428. The first RAT module 422-1, the second RAT module 422-2, the preferred RAT selection module 424, the reselection control module 426, and/or the neighbor measurement module 428 can be, for example, instructions/code residing at least temporarily in the processor 420, a storage space storing the instructions/code, or a part of a circuitry of the processor 420.

Figure 4B:
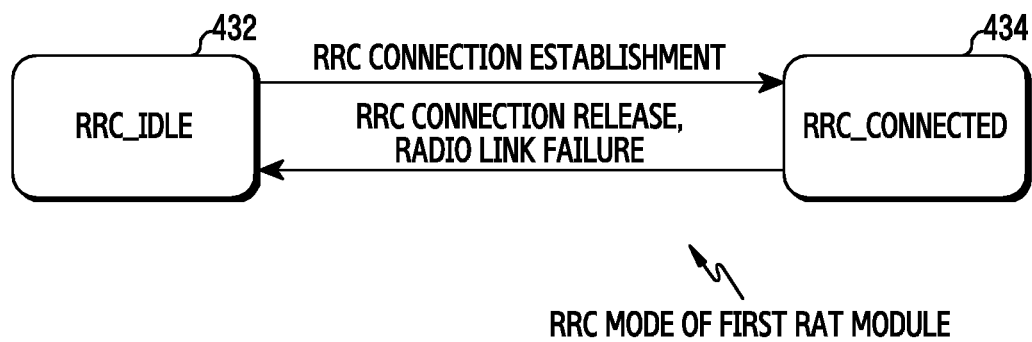
FIG. 4B illustrates operation modes of an electronic device according to various example embodiments of the present disclosure.

The first RAT module 422-1 and the second RAT module 422-2 can provide communication functions according to their corresponding RAT. For example, the first RAT module 422-1 can include a protocol stack for a first RAT, and the second RAT module 422-2 can include a protocol stack for a second RAT. For example, the first RAT module 422-1 and the second RAT module 422-2 can generate and interpret a packet according to a corresponding RAT standard. For example, the first RAT module 422-1 can be a component for NB-IoT communication and the second RAT module 422-2 can be a component for eMTC communication. In this case, the first RAT module 422-1 can manage an RRC mode as shown in FIG. 4B. Referring to FIG. 4B, the first RAT module 422-1 can switch from an RRC_IDLE mode 432 to an RRC_CONNECTED mode 434 through RRC connection establishment, and switch from the RRC_CONNECTED mode 434 to the RRC_IDLE mode 432 when RRC connection release or Radio Link Failure (RLF) is detected. The first RAT module 422-1 and the second RAT module 422-2 can be implemented using separated chipsets or using a single chip.

The preferred RAT selection module 424 can select an RAT to use for a communication service. The preferred RAT selection module 424 can determine a preferred RAT by considering characteristics of a current application. For example, the preferred RAT selection module 424 can determine the preferred RAT based on information about the electronic device 101, service characteristics, or requirements. The reselection control module 426 can control inter-RAT cell reselection for the preferred RAT. The reselection control module 426 can determine whether the inter-RAT cell reselection is required, and control to perform the inter-RAT cell reselection. The reselection control module 426 can collect information for the cell reselection, and generate and interpret a message for the cell reselection. The neighbor measurement module 428 can control to search and measure the preferred RAT. The neighbor measurement module 428 can determine a timing for searching and measuring the preferred RAT, and control the RF circuitry 410 according to the determined timing. The neighbor measurement module 428 can determine a frequency band for the preferred RAT search and measurement, and control the RF circuitry 410 according to the determined band.

The processor 420 can control the electronic device 101 to operate in a power reduction (reduced power) mode. For example, the power reduction mode can include one of a Power Saving Mode (PSM) and an extended Discontinuous Reception (eDRX). Since an IoT communication device needs to operate for a long time with a limited battery, it is important to reduce power consumption. For the sake of the power reduction of the IoT device, the 3GPP adopts the PSM in release-12 and adopts the eDRX in release-13.

The PSM is to improve power consumption of an existing RRC idle mode. When entering the PSM, the electronic device 101 may go into a state similar to power-off and may not perform paging monitoring. For example, for the paging monitoring, even power consumption of periodic power-on can be excluded. For example, according to the release-12, the power-off can be maintained for up to 13 days. The release-13 can allow the power-off for up to 413 days. Thus, the IoT device which attempts communication on weekly, monthly, and yearly bases can reduce the power consumption.

The eDRX is the operation mode which increases a paging cycle compared with an existing DRX, and is adopted in the release-13 to improve the power reduction effect. A maximum paging cycle of the existing DRX is 2.56 seconds, which implies that the device needs to wake up in order to receiving a paging message every 2.56 s. In the eDRX mode, the paging cycle expands to 2611.4 s (=43.68 minutes) in the Cat-M1 and to 10485.76 s (=2.91 hours) in the Cat-NB1. Thus, the deactivation/sleep state of the RF circuitry 410 can be allowed during tens of minutes to several hours.

According to various example embodiments of the present disclosure, the processor 420 can conduct the handover or the cell reselection between heterogeneous RATs using the first RAT module 422-1, the second RAT module 422-2, the preferred RAT selection module 424, the reselection control module 426, and the neighbor measurement module 428. For example, the processor 420 can perform methods to be explained according to various example embodiments.

According to various example embodiments of the present disclosure, an electronic device can include a housing, a RF circuitry, disposed within the housing, for processing a signal, a processor, disposed within the housing, coupled to the RF circuitry, and a memory, disposed within the housing, coupled to the processor. The memory can store instructions that, when executed, cause the processor to determine, while accessing a first network supporting a first RAT, to change a serving RAT to a second RAT, to identify a time interval in which the electronic device maintains an active state to communicate with the first network, to control scanning the second RAT during a period determined based on a start timing or an end timing of the time interval, and to control accessing a second network supporting the second RAT based on a result of the scan. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

The memory can store the instructions that, when executed, cause the processor to wake-up at a timing before the start timing, and to control scanning the second RAT within a period from the timing to the start timing. The time interval can include one of a period for receiving a paging message and a period for performing a tracking area update. The memory can store instructions that, when executed, cause the processor to control scanning the second RAT within a period from a timing at which a reference time elapsed after receiving data from the first network to a timing switching to an idle mode. The memory can store instructions that, when executed, cause the processor to control scanning the second RAT on an operating frequency of the first network, and, if the cell of the second RAT is not found on the operating frequency, to control scanning the second RAT on another frequency.

According to various example embodiments of the present disclosure, an electronic device can include a housing, a RF circuitry, disposed within the housing, for processing a signal, a processor, disposed within the housing, coupled to the RF circuitry, and a memory, disposed within the housing, coupled to the processor. The memory can store instructions that, when executed, cause the processor to determine, while accessing a first network supporting a first RAT, to change a serving RAT to a second RAT, to control scanning the second RAT, to control temporarily accessing the first network for attempting to receive data buffered in the first network, and to control accessing a second network supporting the second RAT. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

The memory can store the instructions that, when executed, cause the processor to control transmitting to a server, through the second network, information regarding a packet lastly received from the server. The memory can store instructions that, when executed, cause the processor to control transmitting to a server, a message for notifying a change of a network through the first network, before accessing the second network. The memory can store instructions that, when executed, cause the processor to select the second RAT based on an application being executed and a state of a battery of the electronic device. The first RAT and the second RAT can be usable for providing an IoT service.

Now, explanations are made on various example embodiments for optimizing inter-RAT mobility management performance in a communication environment in which heterogeneous IoT networks coexist. For example, for device-centered inter-RAT mobility management, embodiments are described in which the electronic device 101 itself determines the inter-RAT cell reselection when a network does not provide inter-RAT information. For example, the electronic device 101 can determine a preferred RAT by considering a battery status and characteristics of a current application, and execute a different mobility support method according to a type of the preferred RAT. In addition, for buffered packet reception, example embodiments are described for receiving a packet buffered in an existing core without loss in the inter-RAT cell reselection.

Figure 5:
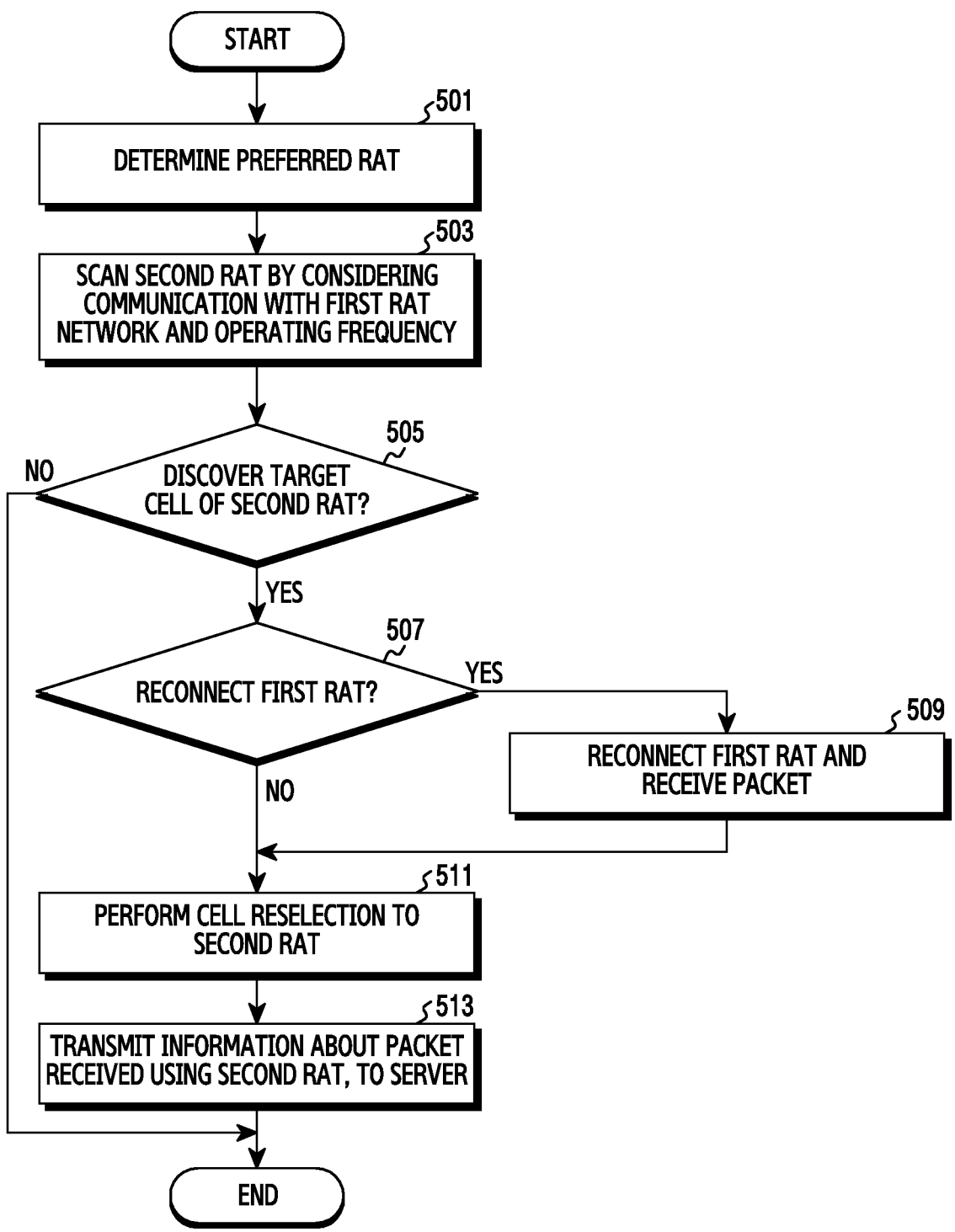
FIG. 5 illustrates a flowchart for changing a Radio Access Technology (RAT) in an electronic device according to various example embodiments of the present disclosure.

FIG. 5 depicts a flowchart for changing an RAT in an electronic device according to various example embodiments of the present disclosure. FIG. 5 illustrates an example operating method of the electronic device 101.

Referring to FIG. 5, in operation 501, the processor 420 of the electronic device 101 can determine a preferred RAT. For example, the preferred RAT selection module 424 can determine the preferred RAT based on status information of the electronic device 101 and application characteristics. In an embodiment, operation 501 can be triggered when a certain condition is satisfied. For example, the certain condition can include that a signal strength of a current serving RAT falls below a threshold. The preferred RAT can be determined based on a battery status and characteristics of a current application. In an example embodiment, the current serving RAT of the electronic device 101 can be the first RAT, and the second RAT can be selected as the preferred RAT in operation 501.

In operation 503, the processor 420 can scan the second RAT by considering network communication and an operating frequency of the first RAT. For example, the first RAT can be the NB-IoT, and the second RAT can be the eMTC. For example, the first RAT can be the eMTC, and the second RAT can be the NB-IoT. Herein, scan can include search and measurement. For example, the neighbor measurement module 428 can scan the preferred RAT selected in operation 501. As the processor 420 considers the communication with the network of the first RAT, additional operation state change (e.g., activation of the RF circuitry 410) for the scan can be reduced. Scanning in consideration of the communication with the first RAT network may indicate that the scanning is performed during a period depending on a timing associated with the control of the state regarding the first RAT network. For example, the period depending on the timing associated with the control of the state can precede or follow a state transition timing (e.g., state transition for paging monitoring, state transition for Tracking Area Update (TAU), or state transition for idle mode entry). For example, scanning in consideration of the communication with the first RAT network can indicate that the scanning is conducted during a period determined based on a start timing or an end timing of a time interval in which the active state needs to be maintained for the communication with the first RAT network. Also, as the processor 420 considers the operating frequency of the first RAT, it is more likely to discover a target cell of the second RAT by scanning a relatively small frequency range.

In operation 505, the processor 420 can determine whether the target cell of the second RAT is discovered. Herein, the target cell can be determined based on at least one of a signal strength, whether synchronization is obtained, whether system information decoding is successful, whether a service is available, and whether the user of the electronic device 101 is a subscriber of the target cell. The target cell can be referred to as a suitable cell. When the target cell of the second RAT is not discovered, the process can finish (end).

Upon discovering the target cell of the second RAT at operation 505, the processor 420 can determine whether the first RAT is re-accessible in operation 507. The processor 420 can operate in the power reduction mode for the first RAT. In this case, to receive data buffered in the first RAT, re-access to the first RAT can be required. Hence, the first RAT module 422-1 can determine whether it can re-access the first RAT network based on a signal strength of the first RAT which is a currently-serving RAT. When the first RAT is not re-accessible, the process can go to operation 511.

When the first RAT is re-accessible, the processor 420 can re-connect to the first RAT and receive packets in operation 509. For example, by signaling for the reconnection to the first RAT, the first RAT module 422-1 can switch to the connected mode for the first RAT and then receive the buffered data. Notably, when there is no buffered data, the packet reception can be omitted.

In operation 511, the processor 420 can perform cell reselection on the target cell of the second RAT discovered in operation 505. For example, the reselection control module 426 can switch to a communication mode via the second RAT by signaling for the connection to the second RAT.

In operation 513, the processor 420 can transmit information of a packet received via the second RAT, to a server. For example, the second RAT module 422-2 can transmit information about a last packet received, to the server so that the server can recognize a packet missing in the RAT switch operation.

As described in FIG. 5, the electronic device 101 can switch between heterogeneous RATs and attempt to receive a buffered packet(s). Hence, the inter-RAT switch is enabled even when the network does not provide the other RAT information. Also, even when the cores are separated, the packet missing due to the inter-RAT switch can be prevented.

The preferred RAT selection is now described. Provided that the electronic device 101 is presently connected to the NB-IoT network, operations of the electronic device 101 can differ depending on the preferred RAT. The RAT preferred by the electronic device 101 can be determined by the battery status and the characteristics of the current application. First, when a remaining battery capacity of the electronic device 101 is insufficient or low, it is advantageous to use the NB-IoT network which consumes less power. In contrast, when the remaining battery capacity of the electronic device 101 is sufficient or high, the preferred RAT can be selected according to the current application. When the application requires no mobility support and intermittently transmits a small amount of data, the NB-IoT network can be preferred. In contrast, when the application requires mobility support and a voice service, the eMTC can be preferred. For doing so, the electronic device 101 can operate as follows.

Figure 6:
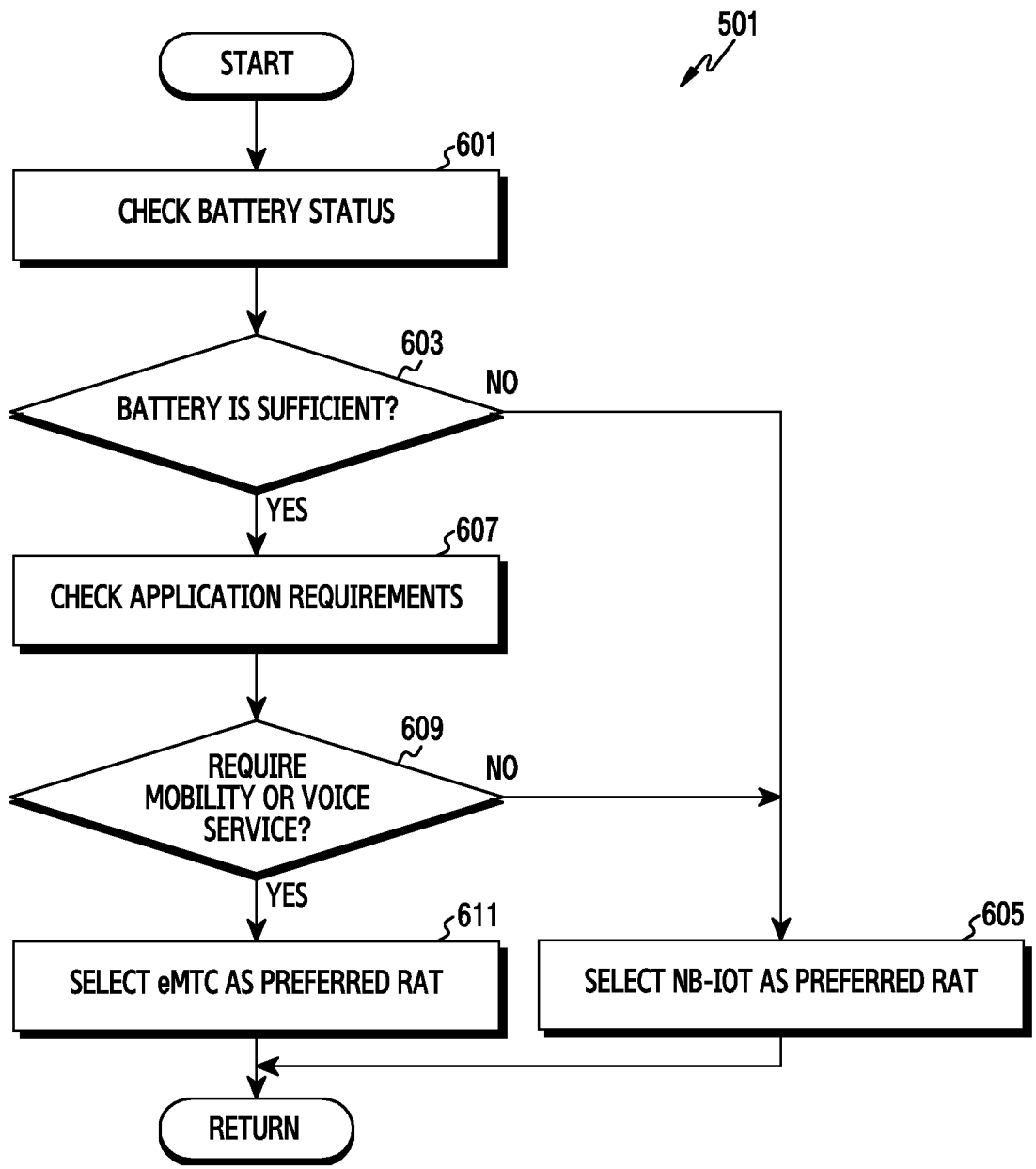
FIG. 6 illustrates a flowchart for selecting a preferred RAT in an electronic device according to various example embodiments of the present disclosure.

FIG. 6 depicts a flowchart for selecting a preferred RAT in an electronic device according to various example embodiments of the present disclosure. FIG. 6 illustrates an operating method of the electronic device 101.

Referring to FIG. 6, in operation 601, the processor 420 of the electronic device 101 can check a battery (e.g., the battery 296) status. For example, the preferred RAT selection module 424 can check a remaining battery capacity and an external power connection. For example, the preferred RAT selection module 424 can obtain the battery status according to a signal from a charge integrated circuit or information provided from other processor (e.g., the AP).

In operation 603, the processor 420 can determine whether the remaining battery capacity is sufficient. For example, the preferred RAT selection module 424 can determine whether the remaining battery capacity exceeds a threshold. When the remaining battery capacity is not sufficient, the process can go to operation 605. In contrast, when the remaining battery capacity is sufficient, the process can go to operation 607. According to an example embodiment, when external power is connected, the process can proceed to operation 607 even when the remaining battery capacity is insufficient.

In operation 605, the processor 420 can select the NB-IoT as the preferred RAT. The NB-IoT, which requires the less power than the eMTC, can be more suitable for the relatively low remaining battery capacity. In response to the remaining battery capacity being below the threshold, the preferred RAT selection module 424 can select the NB-IoT as the preferred RAT.

In operation 607, the processor 420 can check requirements of an application. Herein, the requirements of the application can include at least one of mobility, real-time service, a minimum data rate, and a maximum delay. For doing so, the preferred RAT selection module 424 can collect information about the application(s) which is being executed or to be executed, or bearer information.

In operation 609, the processor 420 can determine whether the application being executed or to be executed requires mobility or a voice service. For example, the preferred RAT selection module 424 can select the preferred RAT based on the application requirements identified in operation 607. When the application requires mobility or a voice service, the processor 420 can select the eMTC as the preferred RAT in operation 611. In contrast, when the application does not require mobility or a voice service, the processor 420 can select the NB-IoT as the preferred RAT in operation 605.

As described in FIG. 6, the processor 420 can determine the preferred RAT based on the status of the electronic device 101 and the application characteristics. While only the NB-IoT and the eMTC are mentioned as the candidate RATs in FIG. 6, a similar criterion (or criteria) can be applied to other IoT networks. For example, in various embodiments, the processor 420 can select the preferred RAT by considering a required power and a coverage size for the IoT communication.

Figure 7:
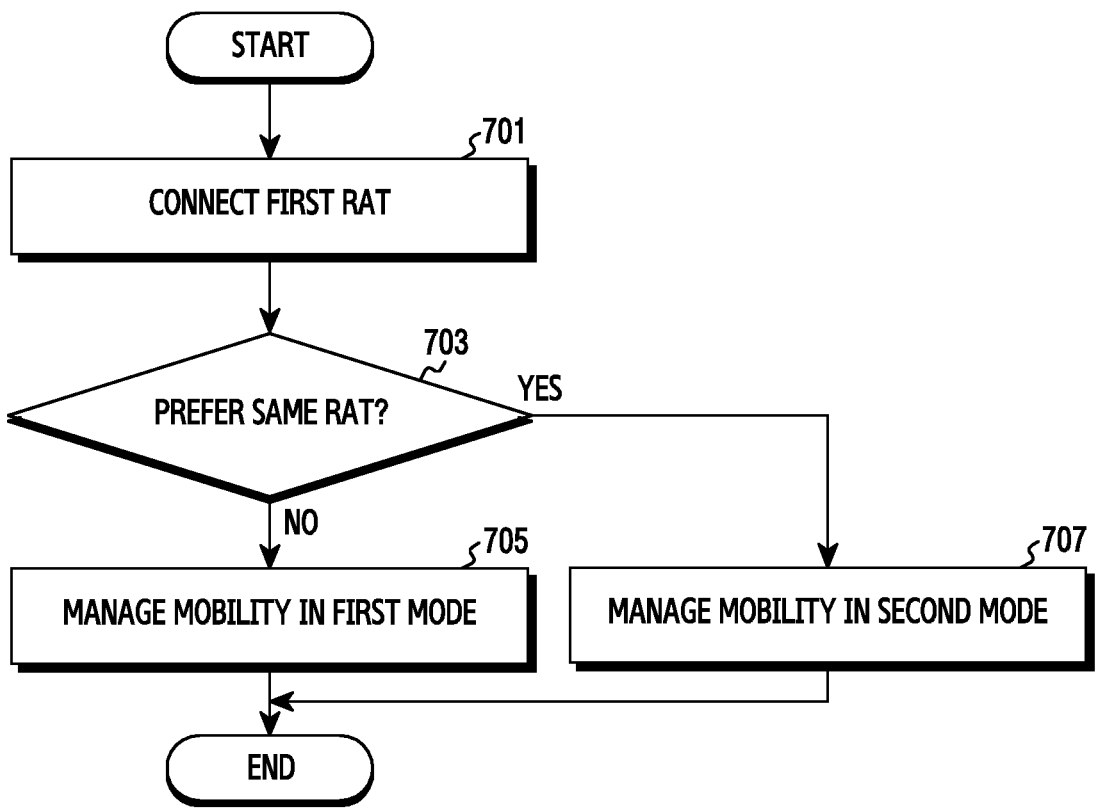
FIG. 7 illustrates a flowchart for managing mobility in an electronic device according to various example embodiments of the present disclosure.

FIG. 7 depicts a flowchart for managing mobility in an electronic device according to various example embodiments of the present disclosure. FIG. 7 illustrates an example operating method of the electronic device 101.

Referring to FIG. 7, in operation 701, the processor 420 of the electronic device 101 can operate in a mode connected to a network using the first RAT. If necessary, the processor 420 can operate in the power reduction mode (e.g., PSM, eDRX, etc).

In operation 703, the processor 420 can determine whether the same RAT is preferred. For example, when the preferred RAT selection module 424 selects the preferred RAT, the processor 420 can determine whether the preferred RAT selected by the preferred RAT selection module 424 is the first RAT. For example, the processor 420 can determine whether a currently-serving RAT is selected as the preferred RAT.

When the same RAT is not preferred, the processor 420 can manage mobility in a first mode in operation 705. The first mode attempts a switch between heterogeneous IoT networks, and can include scanning other RAT(s) and receiving the buffered packet, to be explained. For example, in the first mode, operations 503 through 511 of FIG. 5 can be performed.

In contrast, when the same RAT is preferred, the processor 420 can manage mobility in a second mode in operation 707. The second mode maintains the connection to the same IoT network, and can include handover/cell reselection in the same RAT.

As mentioned in FIG. 7, the electronic device 101 can manage mobility in different manners depending on whether the preferred RAT and the serving RAT are the same. In the following, example embodiments in which the preferred RAT and the serving RAT are different are explained with reference to the drawings.

When a different RAT from the currently-serving RAT is preferred, the electronic device 101 can search a neighboring cell of the preferred RAT and perform cell reselection on the preferred RAT. When the network of the currently-serving RAT does not provide other RAT information or the other RAT information is, even if provided, not available, the electronic device 101 itself can search the neighboring cell of the preferred RAT. In so doing, according to characteristics of the electronic device 101 (which is highly likely to operate using a battery), it is necessary to search with a minimum power consumption. Hence, various example embodiments for determining a scan timing and a scanning frequency band are explained.

Figure 8:
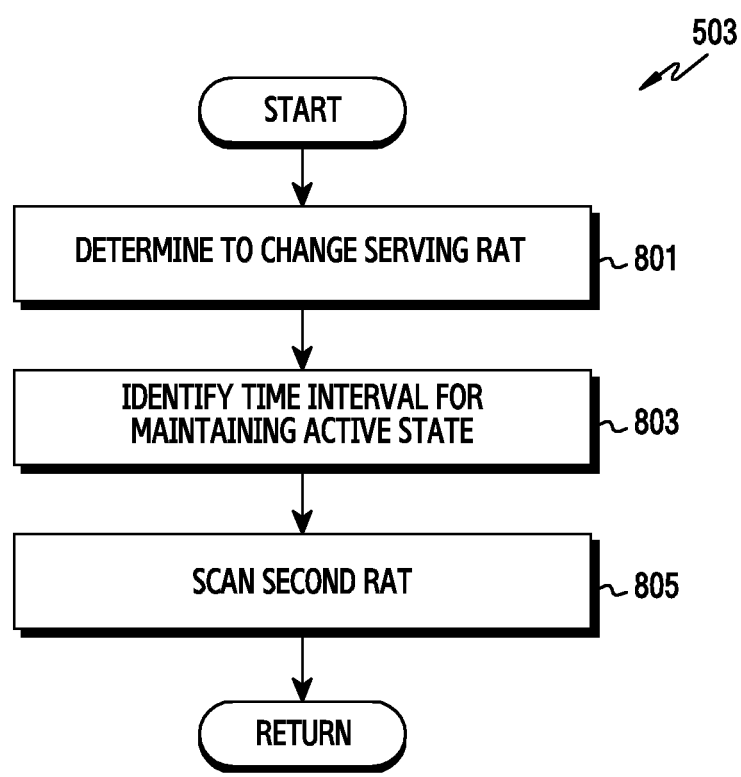
FIG. 8 illustrates a flowchart for scanning other RAT in an electronic device according to various example embodiments of the present disclosure.

FIG. 8 depicts a flowchart for scanning other RAT in an electronic device according to various example embodiments of the present disclosure. FIG. 8 illustrates an example operating method of the electronic device 101. In particular, FIG. 8 illustrates a specific process of operation 503 of FIG. 5.

Referring to FIG. 8, in operation 801, the processor 420 of the electronic device 101 can determine to change a serving RAT. For example, the processor 420 can determine whether to change the serving RAT to the second RAT while accessing a first network supporting the first RAT. Herein, the first RAT and the second RAT use a relatively narrower bandwidth than the cellular network and can allow a longer sleep state than the cellular network. For example, the first RAT and the second RAT can be RATs for IoT communication. For example, the first RAT and the second RAT can be the NB-IoT and the eMTC respectively.

In operation 803, the processor 420 can identify a time interval for maintaining an active state. The processor 420 can identify the time interval for maintaining the active state for the communication with the first network. For example, the time interval for maintaining the active state can include, without limitation, at least one of a wake-up period for paging monitoring in the eDRX mode, a TAU period in the PSM, and a period until entering the RRC_IDLE mode after packet reception.

In operation 805, the processor 420 can control scanning the second RAT. The processor 420 can scan the second RAT during a period determined based on the identified time interval. For example, the processor 420 can scan the second RAT during the period determined based on a start timing or an end timing of the identified time interval. According to an example embodiment, the processor 420 can wake up before the start timing and control scanning the second RAT within a period before the start timing. According to another example embodiment, the processor 420 can control scanning the second RAT within a period from a certain time ahead of the end timing until the end timing. According to an example embodiment, the processor 420 can scan the second RAT on an operating frequency of the first network, and, when not discovering the cell of the second RAT on the operating frequency, scan the second RAT on another frequency.

As discussed in FIG. 8, the electronic device 101 can scan the other RAT using the status transition relating to the communication with the serving RAT. Now, specific scanning operations shall be described in further detail with reference to FIGS. 9A, 9B, and 10.

The electronic device 101 can enter the PSM or the eDRX mode to reduce power consumption. In the eDRX mode, the electronic device 101 can sleep for most of the time and wake up at a preset timing for paging monitoring. Similarly, in the PSM, the electronic device 101 can wake up at a timing requiring the TAU. Hence, the electronic device 101 can calculate a scan time $T_{scan}$ and wake up before $T_{scan}$ earlier than the paging or TAU timing for the sake of the scan. This is to prevent the electronic device 101 from separately waking up for the scan regardless of the paging monitoring or the TAU. Thus, at least one wake-up can be omitted per scan.

According to an example embodiment, the electronic device 101 can perform the scan before any paging timing (e.g., paging timing—$T_{scan}$), or before at least part of the paging timing. Thus, a scan cycle can be determined based on Equation 1.

$$T_s = n \times T_{paging}, \quad n = 1, 2, 3 \ldots \qquad (1)$$

In Equation 1, $T_s$ denotes the scan cycle, and $T_{paging}$ denotes a paging monitoring cycle.

Based on Equation 1, n determines the scan cycle, and the electronic device 101 can adjust the value n by considering the battery status. According to an example embodiment, the electronic device 101 can decrease n for sufficient battery capacity, increase n for insufficient battery capacity, and thus adjust the scan cycle. According to another example embodiment, the electronic device 101 can regulate n based on urgency of the cell reselection. For example, as a channel quality for the serving RAT deteriorates, n can decrease. For example, as a timing for communicating with the server approaches, n can decrease.

Such scan can be referred to as periodic scan. Now, operations of the electronic device 101 for performing the periodic scan are described.

Figure 9A:
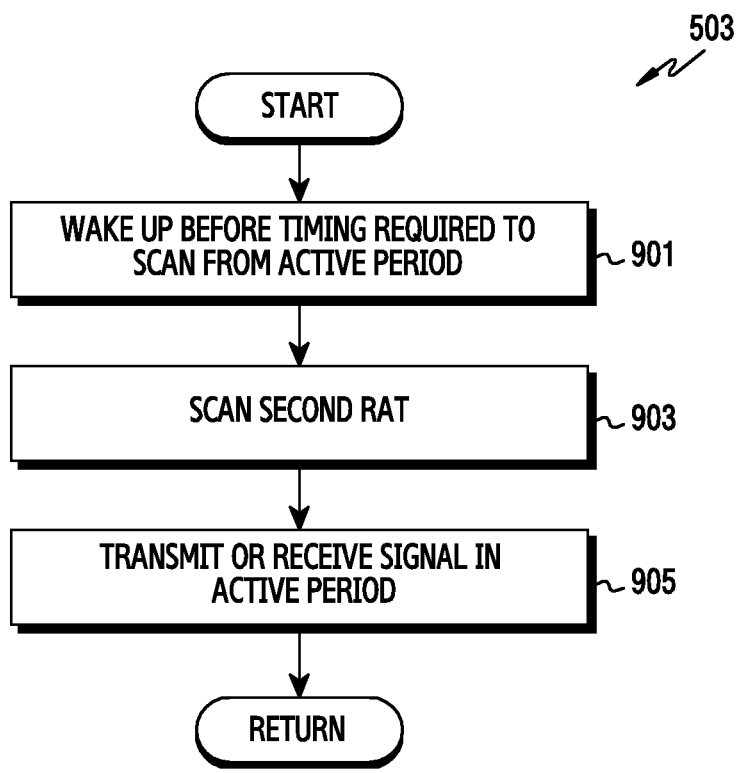
FIG. 9A illustrates a flowchart for scanning other RAT using a periodic wake-up operation in an electronic device according to various example embodiments of the present disclosure.

FIG. 9A depicts a flowchart for scanning another RAT using periodic wake-up in an electronic device according to various example embodiments of the present disclosure. FIG. 9A illustrates specific operations of the operation 503 of FIG. 5.

Referring to FIG. 9A, in operation 901, the processor 420 of the electronic device 101 can wake up before a timing required for the scan from an active period. Herein, the active period can include an on-duration of the eDRX mode or the TAU period of the PSM. For example, the neighbor measurement module 428 can identify the active period for waking up for purposes other than the scan, and wake up at an earlier timing corresponding to the scan time (e.g., $T_{scan}$). For example, as shown in FIG. 9B, the electronic device 101 can wake up at a timing t1 (902) which is before (earlier than) the start timing of the active period t2 (904).

In operation 903, the processor 420 can control scanning the second RAT. For example, the neighbor measurement module 428 can attempt to detect a signal transmitted from a base station of the second RAT, acquire synchronization, and decode system information. Further, the neighbor measurement module 428 can estimate a channel quality of the second RAT. For example, as shown in FIG. 9B, the electronic device 101 can scan during the period from the timing t1 (902) to the timing t2 (904).

In operation 905, the processor 420 can control transmitting or receiving a signal in the active period. For example, when the active period is the on-duration of the eDRX mode, the processor 420 can receive a message notifying the paging from the network of the first RAT. Alternatively, when the active period is the TAU period of the PSM, the processor 420 can send a message notifying a changed tracking area to the first RAT network.

Figure 9B:
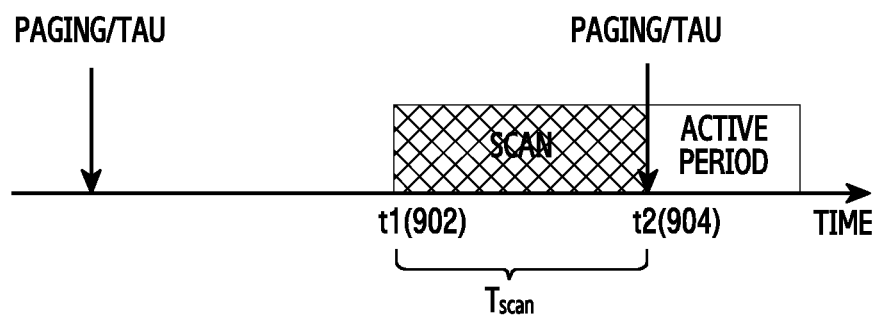
FIG. 9B illustrates a timing for scanning other RAT using a periodic wake-up operation in an electronic device according to various example embodiments of the present disclosure.

As stated in FIG. 9A and FIG. 9B, the electronic device 101 can scan at the front end of the period (e.g., the active period) for waking up for purposes other than the scan. Thus, at least one additional status transition for the scanning can be excluded. However, according to other example embodiments, the electronic device 101 can scan at a back end of the period for waking up for purposes other than the scanning. Likewise, at least one additional status transition for the scanning can be excluded.

While the number of the status transitions is reduced in FIG. 9A and FIG. 9B, a time length of maintaining the active state can increase. Hence, an embodiment for scanning without increasing the time length of maintaining the active state is now explained.

Referring back to FIG. 4B, without traffic, the electronic device 101 can enter the RRC_IDLE mode. The electronic device 101 can enter the RRC_IDLE mode according to a direction of the base station. In this case, the electronic device 101 can maintain the active state, but may not perform any operation during a period from a last data transmission/reception timing to a timing for receiving a message (e.g., RRC connection release-NB) indicating connection release. Accordingly, using the corresponding period, the electronic device 101 can conduct the scan without interruption and additional power consumption in the communication with the serving RAT. Such a scan can be referred to as a low-power scan. According to an example embodiment, the low-power scan can require idle timer estimation and last traffic determination.

Mostly, in response to no Mobile Oriented (MO)/Mobile Terminated (MT) traffic during a certain time (e.g., $T_{inactive}$), the base station can send a message (e.g., RRC connection release-NB) to the electronic device 101 indicating connection release and thus cause the electronic device 101 operate in the idle mode. According to an example embodiment, a timer value used by the base station is not delivered to the electronic device 101, but the electronic device 101 can indirectly estimate the timer value using a time difference between the last MO/MT traffic timing and an actual timing for receiving the message indicating the connection release.

Typically, an IoT packet is small in size and can complete its transmission within a short time. In response to no MT traffic during a threshold time (e.g., $T_{nopacket}$) after the MT traffic is received, the electronic device 101 can determine transmission complete of the MT traffic. Since the MO traffic can be identified by the electronic device 101, the electronic device 101 can determine the MO traffic transmission complete without monitoring during the threshold time (e.g., $T_{nopacket}$).

Now, operations of the electronic device 101 for the low-power scan are described.

Figure 10A:
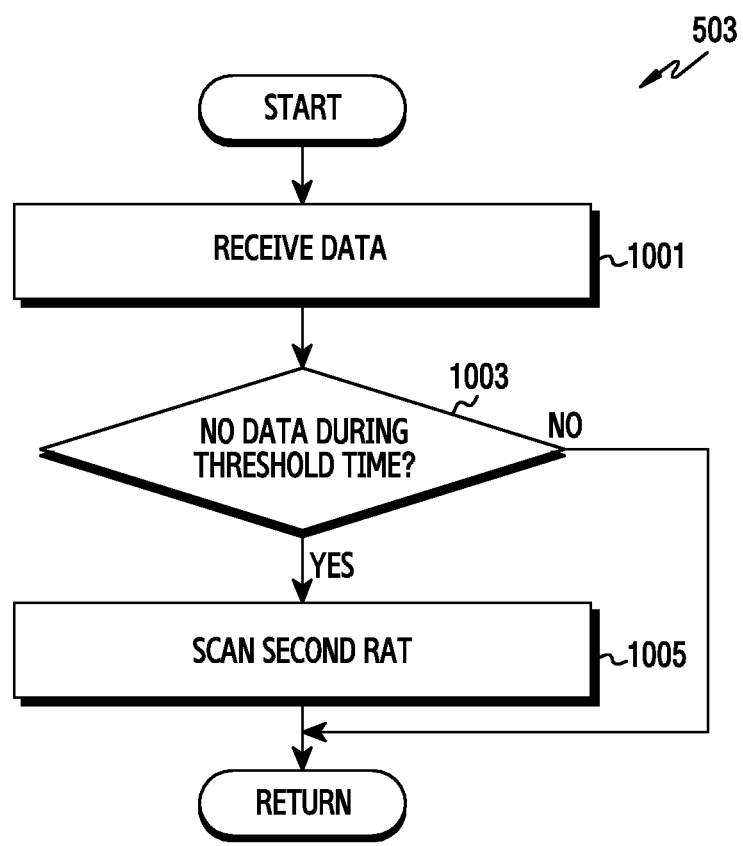
FIG. 10A illustrates a flowchart for scanning other RAT using a traffic un-occurred period in an electronic device according to various example embodiments of the present disclosure.

FIG. 10A depicts a flowchart for scanning other RAT using a traffic un-occurred period in an electronic device according to various example embodiments of the present disclosure. FIG. 10A illustrates a specific process of operation 503 of FIG. 5.

Referring to FIG. 10A, in operation 1001, the processor 420 of the electronic device 101 can control receiving data from the serving RAT. For example, the electronic device 101 is connected to the serving RAT and can transmit and receive traffic to and from the serving RAT.

In operation 1003, the processor 420 can determine whether data occurs during a threshold time. Herein, the data can include MT traffic and MO traffic. For example, the processor 420 can determine whether the MO traffic is not buffered during the threshold time and the MT traffic is not received during the traffic time.

In response to no data during the threshold time, the processor 420 can scan the second RAT in operation 1005. For example, in response to no data during the threshold time after the data is received, the neighbor measurement module 428 can scan the second RAT. For example, referring to FIG. 10B, when no additional MT packet is received during a period from a data reception timing t1 (1002) to a timing t2 (1004) after a threshold time (e.g., $T_{nopacket}$) and no MO traffic is buffered, the electronic device 101 can determine that the data reception is completed. Next, the processor 420 can control scanning the second RAT during a period (e.g., $T_{inactive}-T_{nopacket}$) ranging from the timing t2 (1004) after the threshold time (e.g., $T_{nopacket}$) to a timing t3 (1006) for expecting to receive a message indicating connection release.

Figure 10B:
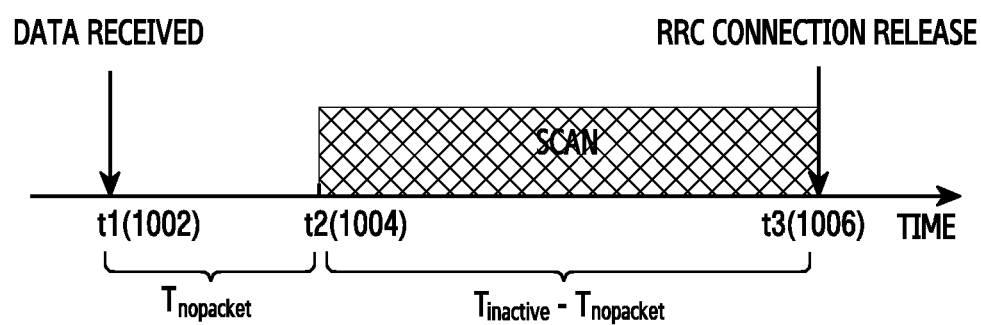
FIG. 10B illustrates a timing for scanning other RAT using a traffic un-occurred period in an electronic device according to various example embodiments of the present disclosure.

As stated in FIG. 10A and FIG. 10B, the other RAT can be scanned in the period until the idle mode entry after the last traffic occurs. Hence, effective scanning can be achieved without an additional active period.

The above-mentioned example embodiments relate to the scan timing. Since the scanning includes the signal search, a frequency band to search should be specified. In the following, 2-stage frequency band selection for scanning the serving RAT and the other RAT is explained.

A communication provider can operate two or more IoT networks (e.g., NB-IoT, eMTC, etc) at the same time. In this case, the NB-IoT and the eMTC are highly likely to operate in the same/adjacent band of the provider. Accordingly, the electronic device 101 can perform limited scanning which scans the frequency band of the serving RAT for another RAT. For example, when the serving RAT (e.g., the first RAT) is the NB-IoT, the electronic device 101 can identify a current frequency band. Also, the electronic device 101 can identify a frequency band used by the NB-IoT using 'InterFreqCarrierFreqList-NB' provided from the SIB-Type5-NT. When discovering no cell of the other RAT through the limited scan, the electronic device 101 can perform full scan to search the entire band for other RAT cell. The 2-phase scan is now described with reference to FIG. 11.

Figure 11:
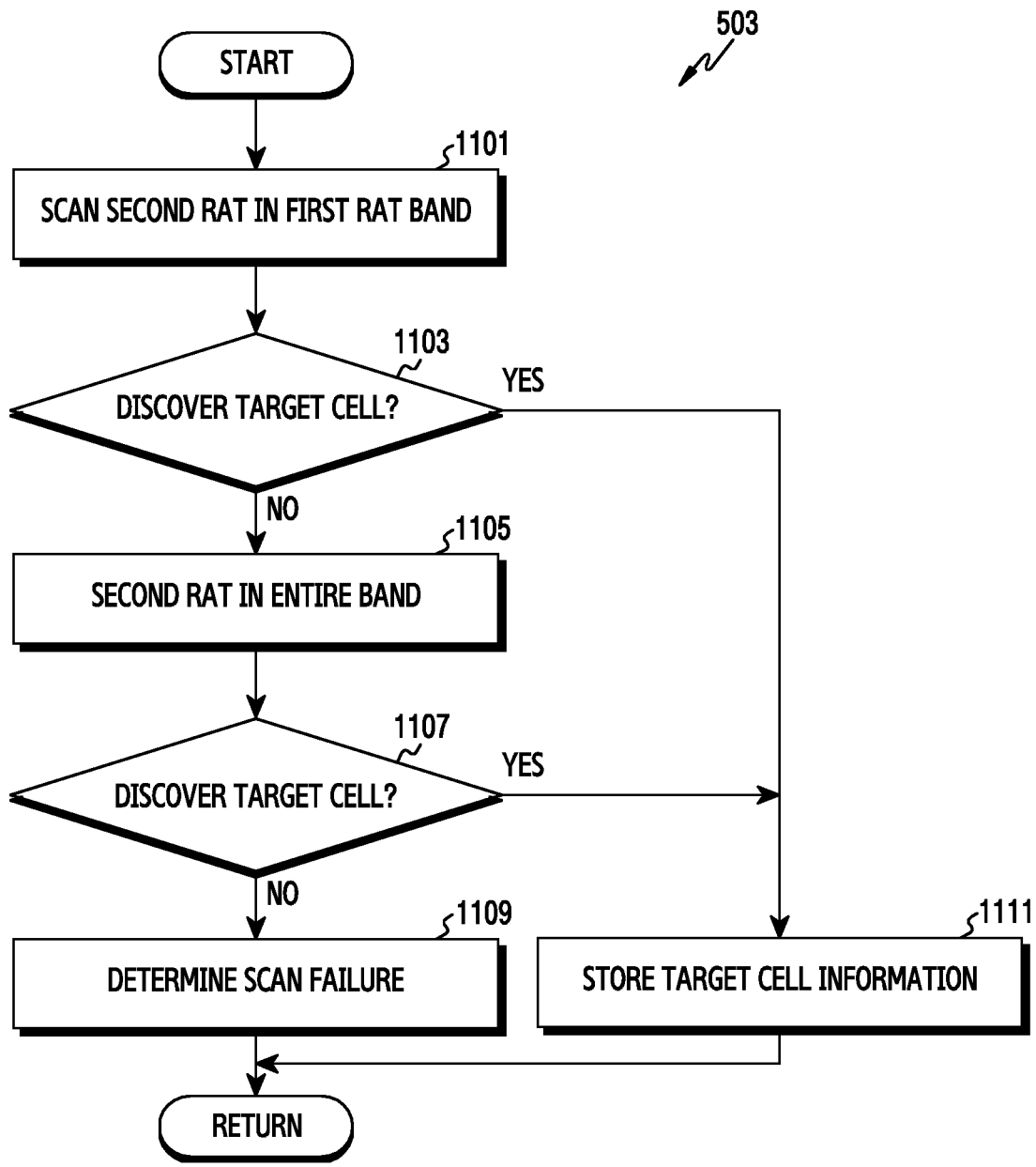
FIG. 11 illustrates a flowchart for scanning other RAT based on a frequency range in an electronic device according to various example embodiments of the present disclosure.

FIG. 11 depicts a flowchart for scanning other RAT based on a frequency range in an electronic device according to various example embodiments of the present disclosure. FIG. 11 illustrates an operating method of the electronic device 101. In particular, FIG. 11 illustrates a specific process of operation 503 of FIG. 5.

Referring to FIG. 11, in operation 1101, the processor 420 of the electronic device 101 can control scanning the second RAT in a first RAT band. For example, the neighbor measurement module 428 can identify the frequency band used by the first RAT, and scan the second RAT in the identified frequency band. For doing so, the neighbor measurement module 428 can receive frequency band information from the first RAT module 422-1.

In operation 1103, the processor 420 can determine whether a target cell is discovered. Herein, the target cell can be determined based on, for example and without limitation, at least one of a signal strength, whether synchronization is obtained, whether system information decoding is successful, whether a service is available, and whether a user of the electronic device 101 is a subscriber of the target cell. The target cell can be referred to as a suitable cell. When the target cell of the second RAT is discovered, the process goes to operation 1111.

When not detecting the target cell, the processor 420 can control scanning the second RAT in the entire band in operation 1105. For example, the neighbor measurement module 428 can scan the second RAT in every frequency band used by the second RAT. Herein, entire band information can be pre-stored. In so doing, the frequency band scanned in operation 1101 can excluded from the scan.

In operation 1107, the processor 420 can determine whether the target cell is discovered. Herein, the target cell can be determined based on, for example and without limitation, at least one of the signal strength, whether the synchronization is obtained, whether the system information decoding is successful, whether the service is available, and whether the user of the electronic device 101 is the subscriber of the target cell. The target cell can be referred to as the suitable cell.

When not discovering the target cell, the processor 420 can determine a scan failure in operation 1109. The neighbor measurement module 428 can finish the second RAT scan. Thus, the electronic device 101 can maintain the first RAT as the serving RAT.

In contrast, upon detecting the target cell of the second RAT, the processor 420 can store target cell information in operation 1111. For example, the neighbor measurement module 428 can store, for example and without limitation, at least one of an operating frequency, a signal strength, a channel quality, and system information of the target cell of the second RAT. Next, although not depicted, the electronic device 101 can determine to switch the serving RAT through the discovered target cell. The stored information can be used for handover or cell reselection of the electronic device 101.

As shown in FIG. 11, the electronic device 101 can scan an RAT different from the serving RAT. By discovering the target cell through the limited scan, power consumption for the scan can be greatly reduced.

Hereafter, inter-RAT cell reselection and the buffered packet reception are described. Prior to the cell reselection, the electronic device 101 can access a network of the existing RAT and receive a buffered packet as shown in FIGS. 12, 13A, and 13B.

Figure 12:
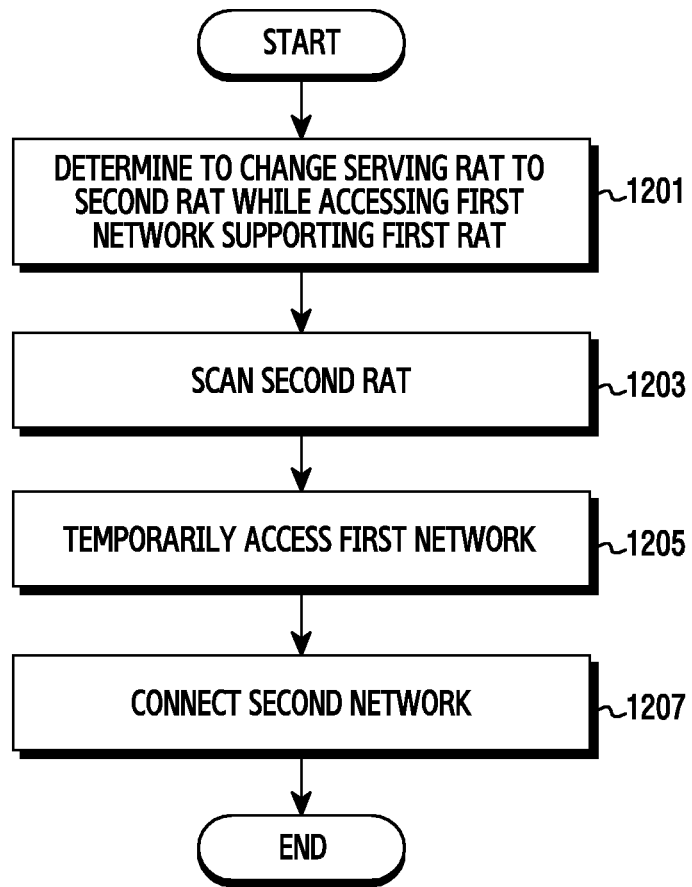
FIG. 12 illustrates a flowchart for forwarding a packet in an electronic device according to various example embodiments of the present disclosure.
Figure 13A:
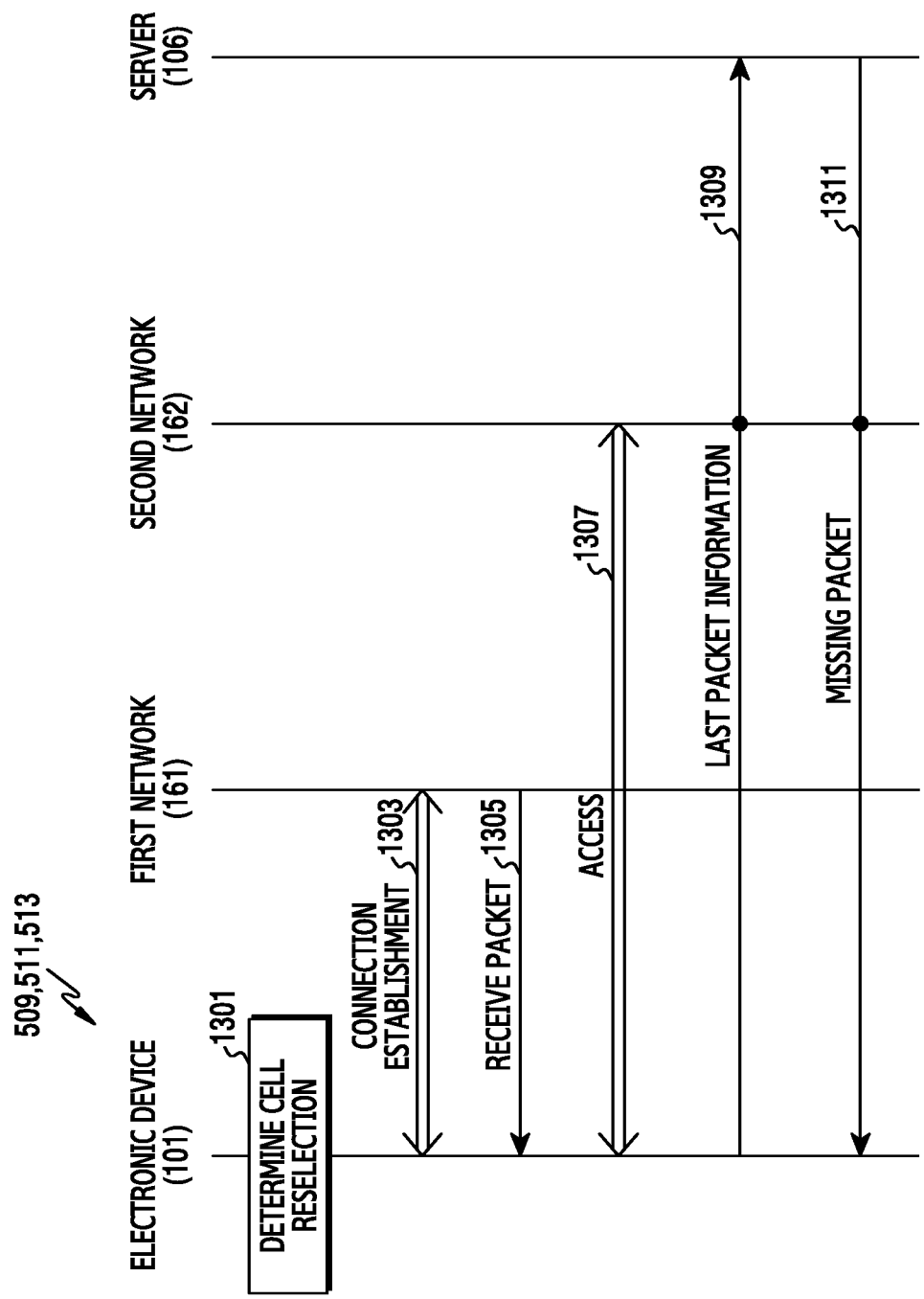
FIGS. 13A and 13B illustrate signal exchange for forwarding a packet in an electronic device according to various example embodiments of the present disclosure.
Figure 13B:
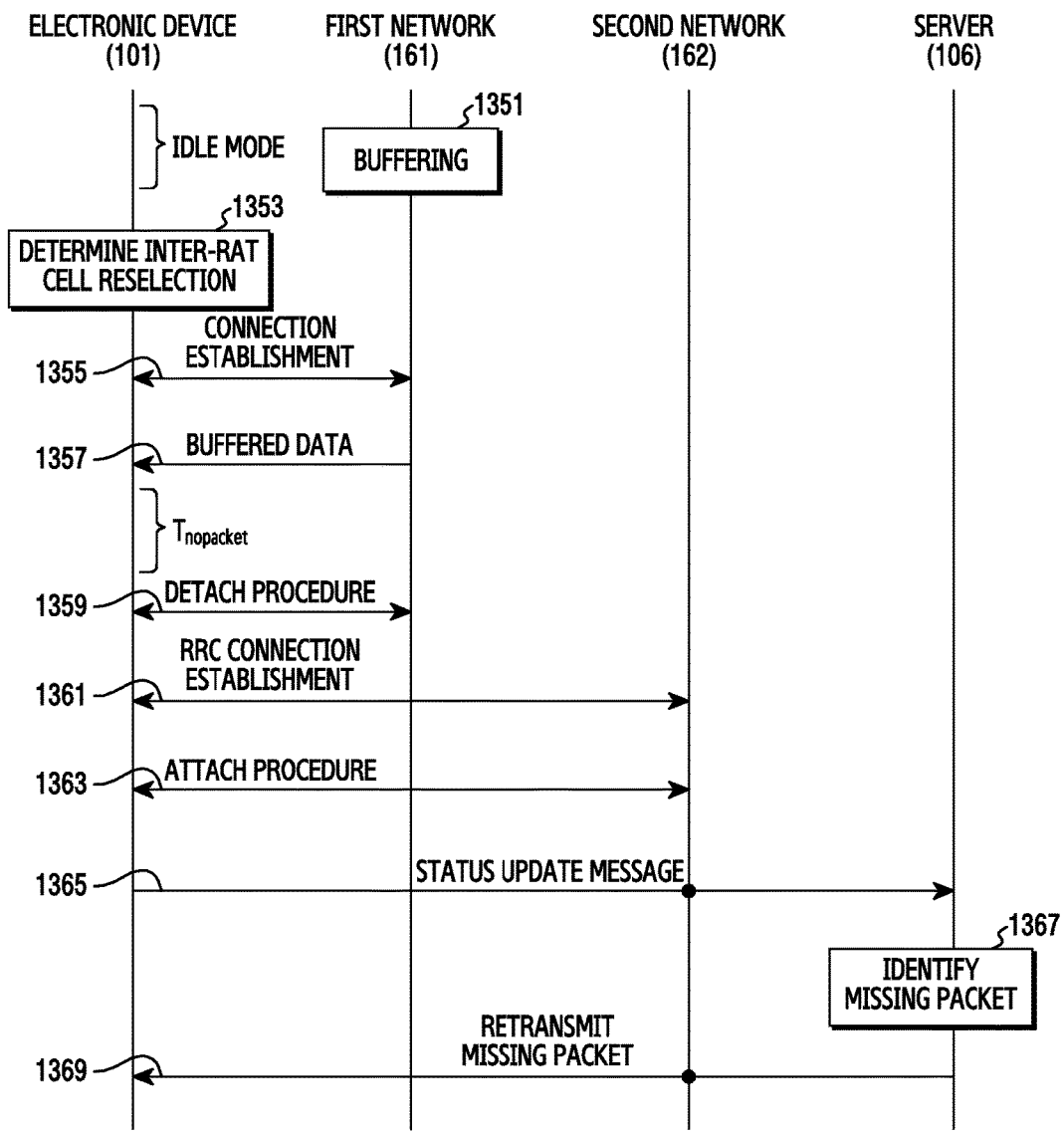

FIG. 12 depicts a flowchart for forwarding a packet in an electronic device according to various example embodiments of the present disclosure. FIG. 12 illustrates an example operating method of the electronic device 101.

Referring to FIG. 12, in operation 1201, the processor 420 of the electronic device 101 can determine to change the serving RAT to the second RAT while accessing the network supporting the first RAT. For example, the processor 420 can select a preferred RAT by considering status information (e.g., battery status or characteristics of current application) and then confirm that the selected RAT is different from the first RAT currently connected. Hence, the processor 420 can determine to change the serving RAT.

In operation 1203, the processor 420 can scan the second RAT. For example, the processor 420 can search and measure a cell of the second RAT. Through the scan, the processor 420 can select the second RAT cell as the target cell for the cell reselection.

In operation 1205, the processor 420 can temporarily access the first network. For example, the processor 420 can temporarily access the first network in order to attempt to receive data buffered in the first network. Herein, the first RAT and the second RAT use a narrower bandwidth than the cellular network and can allow a longer sleep state than the cellular network. For example, the first RAT and the second RAT can be RATs for IoT communication. For example, the first RAT and the second RAT can be the NB-IoT and the eMTC, respectively.

In operation 1207, the processor 420 can connect to the second network. For example, the processor 420 can perform the cell reselection for the second network. Although not depicted in FIG. 12, after connecting to the second network, the processor 420 can transmit information about a last packet received from a server over the second network, to the server.

As explained in FIG. 12, the electronic device 101 can receive a buffered packet by temporarily accessing the serving network. In the following, specific operations of the packet forwarding are described with reference to FIG. 13A and FIG. 13B.

FIGS. 13A and 13B depict signal exchange for forwarding a packet in an electronic device according to various example embodiments of the present disclosure. FIG. 13A shows a specific process of operations 509, 511, and 513 of FIG. 5 in the electronic device 101.

Referring to FIG. 13A, the electronic device 101 can determine cell reselection in operation 1301. Before doing so, the electronic device 101 can, for example, perform scanning. The electronic device 101 can determine the cell reselection based on information acquired through the scan.

In operation 1303, the electronic device 101 can perform connection establishment with the first network 161. For example, the electronic device 101 can conduct RRC connection establishment or RRC connection re-establishment and thus switch to the connected mode for communicating with the first network 161 which is the existing serving RAT. Notably, in the connected mode for the first RAT, operation 1303 can be omitted. Also, operation 1303 can be omitted when a signal quality/strength for the first network 161 is poor or the electronic device 101 leaves the coverage area of the first network 161.

In operation 1305, the electronic device 101 can receive a packet from the first network 161. For example, the electronic device 101 which re-accesses the existing serving RAT can receive a packet buffered in the first network 161. With no buffered packet, operation 1305 can be omitted. Next, although not depicted, the processor 420 can detach from the first network 161. When operation 1303 is omitted, operation 1305 and the detaching can be also skipped.

In operation 1307, the electronic device 101 can access the second network 162. For example, as shown in FIG. 1B, the electronic device 101 can perform the RRC connect establishment with the base station 122 of the second network 162 and perform an attach procedure. For doing so, the second RAT module 422-2 of the electronic device 101 can generate or interpret at least one RRC message.

In operation 1309, the electronic device 101 can transmit the last received packet information to the server 106 over the second network 162. For example, the electronic device 101 can send a status update message including the last received packet information to the server 106. The status update message can be transmitted to notify the change of the serving RAT. For example, in response to the status update message received, the server 106 can recognize the change of the serving RAT of the electronic device 101.

In operation 1311, the electronic device 101 can receive at least one missing packet from the server 106. The server 106 recognizing the change of the serving RAT can determine whether there is a packet sent to the first network 161 after the electronic device 101 receives the last packet. The packet sent to the first network 161 after the electronic device 101 receives the last packet can be regarded as missing. Hence, the server 106 can re-transmit at least one missing packet over the second network 162. Without the missing packet(s), operation 1311 can be omitted.

FIG. 13B specifies the process of FIG. 13A.

Referring to FIG. 13B, the first network 161 can buffer a packet to send to the electronic device 101 in operation 1351. In so doing, the electronic device 101 can be operating in the idle mode. In operation 1353, the electronic device 101 can determine whether to perform the inter-RAT cell reselection. Upon determining to perform the inter-RAT cell reselection, the electronic device 101 can establish RRC connection with the first network 161, which is the existing serving RAT through the RRC connection establishment in operation 1355.

When the electronic device 101 enters the RRC connected mode for the first network 161, the first network 161 can send the buffered packet to the electronic device 101 in operation 1357. When the signal strength/quality of the first network 161 is poor or the electronic device 101 moves out of the coverage area of the first network 161, operations 1355 and 1357 can be omitted.

When receiving no packet during the time $T_{nopacket}$ from the last received packet, the electronic device 101 can determine that all of buffered packets are received and conduct a detach procedure with the first network 161 in operation 1359. The electronic device 101 can establish the RRC connection with the second network 162 in operation 1361, and newly attach to the second network 162 in operation 1363.

The electronic device 101 completing the attach can send the status update message to the server 106 to notify the server of its migration to the second network 162 in operation 1365. Herein, the status update message can include the last received packet information of the electronic device 101. In operation 1367, the server 106 can check a missing packet using the last received packet information of the electronic device 101. When a packet(s) is missing, the server 106 can retransmit the corresponding packet(s) to the electronic device 101 over the second network 162 in operation 1369. Thus, the electronic device 101 can receive the packet(s) which is buffered in the core of the existing serving RAT but not received, without missing it.

As described in FIG. 13A and FIG. 13B, the electronic device 101 according to an example embodiment can re-access the network (e.g., the first network 161) of the serving RAT, receive the buffered packet of the network of the serving RAT, switch the RAT, and transmit the last packet information to the server 106, thus achieving the same effect as the packet forwarding. Thus, packet loss can be prevented even when the RAT is switched.

In FIG. 13A and FIG. 13B, the last packet information can be transmitted over the new network connected through the cell reselection after the RAT switch. According to another example embodiment of the present disclosure, the electronic device 101 can temporarily access the network of the serving RAT before the RAT switch and then, before the cell reselection, send the message notifying the connection release to the server 106. Hence, the server 106 can determine no more packet transmission over the current network. For example, after operation 1357 in FIG. 13B, the electronic device 101 can send a message notifying the network change to the server 106 over the first network 161 and go to operation 1359.

According to yet another example embodiment of the present disclosure, after determining that the cell reselection is needed, the electronic device 101 can send a message notifying the connection release to the server 106. The server 106 can determine no more packet transmission over the current network. For example, after operation 1353 in FIG. 13B, the electronic device 101 can send a message notifying server 106 of the connection release. Notably, when the connection with the first network 161 is not established in operation 1353, the electronic device 101 can send the send the message notifying the connection release to the server 106 after operation 1355.

The above-stated various example embodiments are related to the RAT switch when the serving RAT is different from the preferred RAT. However, a situation in which the current serving RAT and the preferred RAT are the same can be also considered.

When the serving RAT and the preferred RAT are the same, the electronic device 101, which is already connected to the network of the preferred RAT, may not conduct the scan in advance. In the cell reselection, when the signal strength for the serving cell falls below the threshold after the wake-up, the electronic device 101 can first attempt the cell reselection in the same RAT. In so doing, when not detecting the target cell in the same RAT, the electronic device 101 can attempt cell reselection to another RAT, which will be described with reference to FIG. 14.

Figure 14:
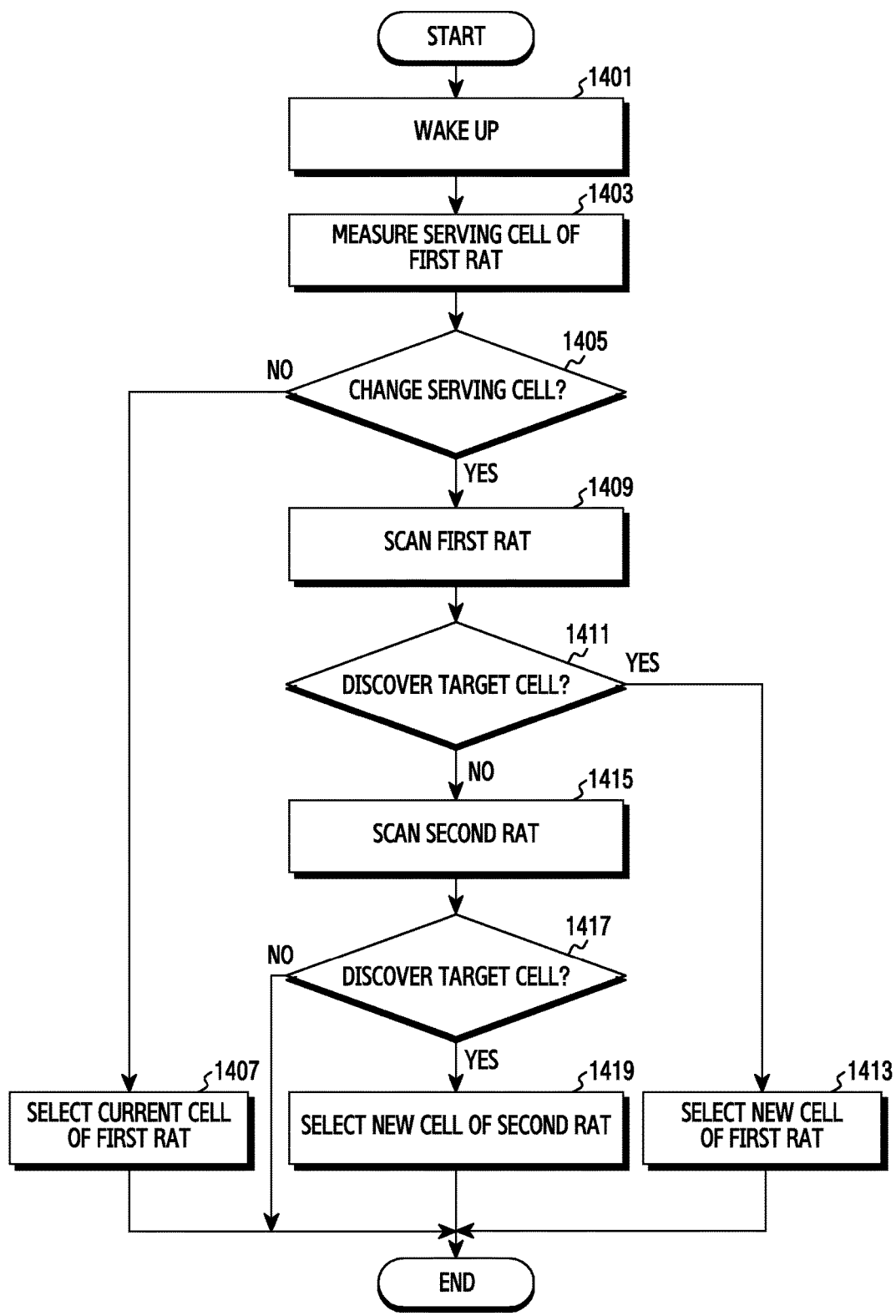
FIG. 14 illustrates a flowchart for selecting a cell in an electronic device according to various example embodiments of the present disclosure.

FIG. 14 depicts a flowchart for cell selection in an electronic device according to various example embodiments of the present disclosure. FIG. 14 illustrates an example operating method of the electronic device 101.

Referring to FIG. 14, in operation 1401, the processor 420 of the electronic device 101 can wake up. For example, the electronic device 101 is connected to the first RAT network, and the processor 420 of the electronic device 101 can operate in the idle mode. According to an example embodiment, for the TAU or the paging monitoring, the processor 420 can enter the active state.

In operation 1403, the processor 420 can measure a serving cell of the first RAT. According to an example embodiment, the processor 420 can control measuring a signal strength or a channel quality of a signal received from a serving base station of the first RAT. For example, the serving cell can be measured using a reference signal transmitted with traffic, or a synchronization signal, without a separate measurement gap.

In operation 1405, the processor 420 can determine whether it is necessary to change the serving cell. For example, when the signal strength or channel quality value measured in operation 1403 is smaller than a threshold, the processor 420 can determine to change the serving cell. In so doing, a plurality of thresholds can be used.

When determining not to change the serving cell, the processor 420 can select a current cell of the first RAT in operation 1407. For example, the processor 420 can maintain the current serving cell.

In contrast, when determining to change the serving cell, the processor 420 can scan the first RAT in operation 1409. The processor 420 can control to scan intra-frequency neighboring cells and inter-frequency neighboring cells. For example, the processor 420 can control searching and measuring one or more neighboring cells which use the same or different frequency band from the serving cell.

In operation 1411, the processor 420 can determine whether the target cell is detected. For example, the processor 420 can determine whether at least one neighboring cell has a signal strength satisfying a certain condition. Herein, the certain condition can include at least one of the signal strength exceeding a first threshold and a signal strength difference of the serving cell exceeding a second threshold.

Upon detecting the target cell in the first RAT, the processor 420 can select a new cell of the first RAT in operation 1413. Hence, the processor 420 can perform the cell reselection to the target cell. For example, the processor 420 can enter the idle mode and then re-establish the connection to the new cell.

In contrast, when not detecting the target cell in the first RAT, the processor 420 can control scanning the second RAT in operation 1415. To scan the second RAT, the processor 420 can perform the 2-phase scan. In so doing, the processor 420 can control scanning the entire band.

In operation 1417, the processor 420 can determine whether a target cell of the second RAT is detected. Herein, the target cell can be determined based on, for example and without limitation, at least one of the signal strength, whether synchronization is obtained, whether system information decoding is successful, whether a service is available, and whether the user of the electronic device 101 is a subscriber of the target cell. The target cell can be referred to as a suitable cell. When the target cell of the second RAT is not detected, the process can finish.

In contrast, upon discovering the target cell of the second RAT, the processor 420 can select a new cell of the second RAT in operation 1419. For example, the processor 420 can select the target cell of the second RAT discovered in operation 1417 as the new cell. Hence, the processor 420 can perform the cell reselection to the target cell of the second RAT. Additionally, to prevent packet loss, the electronic device 101 can receive a buffered packet by temporarily accessing the first RAT network, switch to the second RAT, and then send last received packet information to the server 106.

As set forth above, the electronic device 101 can determine the preferred RAT by taking into account the battery status and the current application, and thus select an optimal RAT for the application. In the inter-RAT scanning, the electronic device 101 can reduce power consumption by considering the communication timing and the operating frequency with the serving network. When the electronic device 101 has a poor signal strength or leaves a coverage area, the electronic device 101 can effectively migrate to another RAT network without service interruption. By temporarily accessing the serving RAT network before switching to the other RAT network, the electronic device 101 can receive the buffered packet without missing it.

According to various example embodiments of the present disclosure, a method for an electronic device can include determining, while accessing a first network supporting a first RAT, to change a serving RAT to a second RAT, identifying a time interval in which the electronic device maintains an active state to communicate with the first network, scanning the second RAT during a period determined based on a start timing or an end timing of the time interval, and accessing a second network supporting the second RAT based on a result of the scan. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

The scanning the second RAT can include waking-up at a timing before the start timing, and scanning the second RAT within a period from the timing to the start timing. The time interval can include one of a period for receiving a paging message and a period for performing a tracking area update. Scanning the second RAT can include scanning the second RAT within a period from a timing at which a reference time elapsed after receiving data from the first network to a timing for switching to an idle mode. Scanning the second RAT can include scanning the second RAT on an operating frequency of the first network, and, if the cell of the second RAT is not found on the operating frequency, scanning the second RAT on another frequency.

According to various example embodiments of the present disclosure, a method of an electronic device can include determining, while accessing a first network supporting a first RAT, to change a serving RAT to a second RAT, scanning the second RAT, temporarily accessing the first network for attempting to receive data buffered in the first network, and accessing a second network supporting the second RAT. Each of a bandwidth of the first RAT and a bandwidth of the second RAT is narrower than a bandwidth of a cellular network, and each of a sleep state of the first RAT and a sleep state of the second RAT is longer than a sleep state of the cellular network.

The method can further include transmitting to a server, information regarding a packet lastly received from the server using the second network. The method can further include transmitting to a server, a message for notifying a change of a network through the first network, before accessing the second network. The method can further include selecting the second RAT based on an application being executed and a state of a battery of the electronic device. The first RAT and the second RAT can be usable for providing an IoT service.

The method and the electronic device according to various example embodiments of the present disclosure can enable switching between heterogeneous IoT networks in the IoT communication.

Also, the method and the electronic device according to various example embodiments of the present disclosure can determine the preferred RAT by considering the status information (e.g., the battery status or the characteristics of the current application) of the electronic device.

The term "module," as used in the present disclosure can refer to a unit including hardware, software, and firmware, and, for example, can be interchangeably used with terms such as logic, logical block, component, circuit, and the like. A module can be a minimum unit of an integral component or for performing one or more functions, or can be a part thereof. A module can be mechanically or electrically implemented. For example, a module can include an Application-Specific Integrated Circuit (ASIC) chip, a Field-Programmable Gate Arrays (FPGAs), or a programmable-logic device, which are known or will be developed to perform certain operations. At least part of a device (e.g., modules or functions thereof) or a method (e.g., operations) according to various example embodiments of the present disclosure can be implemented with instructions stored in a non-transitory computer-readable storage medium (e.g., the memory 130) as a program module. When the instructions are executed by a processor (e.g., the processor 120), the processor can perform a function corresponding to the instructions. The computer readable recording medium can include, without limitation, a hard disk, a floppy disc, a magnetic medium (e.g., a magnetic tape), an optical storage medium (e.g., a Compact Disc-ROM (CD-ROM) or a DVD), a magnetic-optic medium (e.g., a floptical disc), and an internal memory. The instructions can include code created by a compiler or code executable by an interpreter. The module or program module according to various example embodiments can further include at least one or more components among the aforementioned components, or can omit some of them, or can further include additional other components. Operations performed by modules, program modules, or other components according to the various example embodiments of the present disclosure can be executed in a sequential, parallel, repetitive, or heuristic manner. Some of the operations can be executed in a different order or may be omitted, or other operations can be added.

In the above-described various example embodiments of the present disclosure, the elements included in the disclosure are expressed in a singular or plural form. However, the singular or plural expression is used for convenience of explanation and the present disclosure is not limited to a single element or a plurality of elements. The elements expressed in the plural form may be configured as a single element, and the elements expressed in the singular form may be configured as or include a plurality of elements.

While the present disclosure has been shown and described with reference to certain example embodiments thereof, it will be understood by those skilled in the art that various changes in form and details may be made therein without departing from the spirit and scope of the present disclosure as defined by the appended claims and their equivalents.

What is claimed is:

1. A method for an electronic device comprising:
determining, while accessing a first network supporting a first radio access technology (RAT), to change a serving RAT to a second RAT;
identifying a time interval in which the electronic device maintains an active state to communicate with the first network;
scanning the second RAT during a period determined based on a start timing or an end timing of the identified time interval; and
accessing a second network supporting the second RAT based on a result of the scanning,
wherein each of a bandwidth of the first RAT and a bandwidth of the second RAT is narrower than a bandwidth of a cellular network, and
wherein each of a sleep state of the first RAT and a sleep state of the second RAT is longer than a sleep state of the cellular network.

2. The method of claim 1, wherein scanning the second RAT comprises:
waking-up at a timing before the start timing; and
scanning the second RAT within a period from the timing to the start timing.

3. The method of claim 2, wherein the time interval comprises one of a period for receiving a paging message and a period for performing a tracking area update.

4. The method of claim 1, wherein scanning the second RAT comprises scanning the second RAT within a period from a timing at which a reference time elapsed after receiving data from the first network to a timing for switching to an idle mode.

5. The method of claim 1, wherein scanning the second RAT comprises:
scanning the second RAT on an operating frequency of the first network; and
based on the cell of the second RAT not being found on the operating frequency, scanning the second RAT on another frequency.

6. The method of claim 1, wherein scanning the second RAT comprises:
scanning the second RAT; and
temporarily accessing the first network for attempting to receive data buffered in the first network.

7. The method of claim 6, further comprising:
transmitting to a server, through the second network, information regarding a packet lastly received from the server.

8. The method of claim 6, further comprising:
transmitting to a server, a message for notifying a change of a network through the first network, before accessing the second network.

9. The method of claim 6, further comprising:
selecting the second RAT based on an application being executed and a state of a battery of the electronic device.

10. The method of claim 6,
wherein the first RAT and the second RAT are usable for providing internet of things (IoT) service.

11. An electronic device comprising:
a housing;
radio frequency (RF) circuitry, disposed within the housing, for processing a signal;
a processor, disposed within the housing, coupled to the RF circuitry; and
a memory, disposed within the housing, coupled to the processor, wherein the memory stores instructions that, when executed, cause the processor to:
determine, while accessing a first network supporting a first radio access technology (RAT), to change a serving RAT to a second RAT;
identify a time interval in which the electronic device maintains an active state to communicate with the first network;
control scanning the second RAT during a period determined based on a start timing or an end timing of the identified time interval; and
control accessing a second network supporting the second RAT based on a result of the scan,
wherein each of a bandwidth of the first RAT and a bandwidth of the second RAT is narrower than a bandwidth of a cellular network, and
wherein each of a sleep state of the first RAT and a sleep state of the second RAT is longer than a sleep state of the cellular network.

12. The electronic device of claim 11, wherein the memory stores instructions that, when executed, cause the processor to:
wake-up at a timing before the start timing; and
control scanning the second RAT within a period from the timing to the start timing.

13. The electronic device of claim 12, wherein the time interval comprises one of a period for receiving a paging message and a period for performing a tracking area update.

14. The electronic device of claim 11, wherein the memory stores instructions that, when executed, cause the processor to:
control scanning the second RAT within a period from a timing at which a reference time elapsed after receiving data from the first network to a timing for switching to an idle mode.

15. The electronic device of claim 11, wherein the memory stores instructions that, when executed, cause the processor to:
control scanning the second RAT on an operating frequency of the first network; and
based on the cell of the second RAT not being found on the operating frequency, control scanning the second RAT on another frequency.

16. An electronic device comprising:
a housing;
radio frequency (RF) circuitry, disposed within the housing, for processing a signal;
a processor, disposed within the housing, coupled to the RF circuitry; and
a memory, disposed within the housing, coupled to the processor,
wherein the memory stores instructions that, when executed, cause the processor to:
determine, while accessing a first network supporting a first radio access technology (RAT), to change a serving RAT to a second RAT;
control scanning the second RAT;
control temporarily accessing the first network for attempting to receive data buffered in the first network; and
control accessing a second network supporting the second RAT,
wherein each of a bandwidth of the first RAT and a bandwidth of the second RAT is narrower than a bandwidth of a cellular network, and
wherein each of a sleep state of the first RAT and a sleep state of the second RAT is longer than a sleep state of the cellular network.

17. The electronic device of claim 16, wherein the memory stores instructions that, when executed, cause the processor to:
control transmitting to a server, through the second network, information regarding a packet lastly received from the server.

18. The electronic device of claim 16, wherein the memory stores instructions that, when executed, cause the processor to:
control transmitting to a server, a message for notifying a change of a network through the first network, before accessing the second network.

19. The electronic device of claim 16, wherein the memory stores instructions that, when executed, cause the processor to:
select the second RAT based on an application being executed and a state of a battery of the electronic device.

20. The electronic device of claim 16,
wherein the first RAT and the second RAT are usable for providing internet of things (IoT) service.

* * * * *